United States Patent
Chen et al.

(10) Patent No.: US 10,021,017 B2
(45) Date of Patent: Jul. 10, 2018

(54) X CHANNEL TO ZONE IN ZONE ROUTING

(71) Applicant: Futurewei Technologies, Inc., Plano, TX (US)

(72) Inventors: Huaimo Chen, Bolton, MA (US); Renwei Li, Sunnyvale, CA (US)

(73) Assignee: Futurewei Technologies, Inc., Plano, TX (US)

( * ) Notice: Subject to any disclaimer, the term of this patent is extended or adjusted under 35 U.S.C. 154(b) by 56 days.

(21) Appl. No.: 15/060,243

(22) Filed: Mar. 3, 2016

(65) Prior Publication Data

US 2016/0277282 A1     Sep. 22, 2016

Related U.S. Application Data

(60) Provisional application No. 62/135,015, filed on Mar. 18, 2015.

(51) Int. Cl.

| | |
|---|---|
| *H04J 1/16* | (2006.01) |
| *H04L 12/28* | (2006.01) |
| *H04L 12/733* | (2013.01) |
| *H04L 12/727* | (2013.01) |
| *H04L 12/723* | (2013.01) |
| *H04L 12/717* | (2013.01) |

(52) U.S. Cl.
CPC .......... *H04L 45/122* (2013.01); *H04L 45/121* (2013.01); *H04L 45/42* (2013.01); *H04L 45/50* (2013.01)

(58) Field of Classification Search
CPC ................................ H04L 45/22; H04L 45/50
See application file for complete search history.

(56) References Cited

U.S. PATENT DOCUMENTS

| | | | |
|---|---|---|---|
| 6,069,889 | A | 5/2000 | Feldman et al. |
| 6,856,991 | B1 | 2/2005 | Srivastava |
| 8,014,380 | B2 | 9/2011 | Lewis |
| 8,599,849 | B2 | 12/2013 | Aggarwal et al. |
| 2002/0057691 | A1 | 5/2002 | Enoki et al. |
| 2004/0081085 | A1 | 4/2004 | De Cnodder et al. |
| 2005/0220030 | A1 | 10/2005 | Nagami et al. |
| 2006/0036892 | A1 | 2/2006 | Sunna |
| 2006/0146696 | A1 | 7/2006 | Li et al. |
| 2007/0237097 | A1 | 10/2007 | Maharana et al. |
| 2009/0067348 | A1 | 3/2009 | Vasseur et al. |
| 2009/0103555 | A1 | 4/2009 | Bitar |

(Continued)

OTHER PUBLICATIONS

Narten, T., et al., "Guidelines for Writing an IANA Considerations Section in RFCs," draft-iesf-iana-considerations-05.txt, Sep. 17, 1998, 11 pages.

(Continued)

*Primary Examiner* — Melanie Jagannathan
(74) *Attorney, Agent, or Firm* — Conley Rose, P.C.

(57) ABSTRACT

An apparatus for zone routing comprising a transmitter coupled to one or more communication nodes in a network, wherein the communication nodes correspond to less than all edge nodes of the network, a receiver coupled to the communication nodes, and a processor coupled to the transmitter and the receiver, wherein the processor is configured to compute a first path for a label-switched path (LSP) through the network, wherein the first path extends from an ingress node of the edge nodes to an egress node of the edge nodes, obtain a second path that traverses through a first communication node of the communication nodes available to the egress node, and send, via the transmitter, a first LSP creation request message to the first communication node requesting creation of the LSP along the first path.

10 Claims, 26 Drawing Sheets

(56) References Cited

U.S. PATENT DOCUMENTS

| | | |
|---|---|---|
| 2009/0154346 A1 | 6/2009 | Sun |
| 2009/0245253 A1 | 10/2009 | Chen et al. |
| 2010/0142531 A1 | 6/2010 | Kansara et al. |
| 2011/0199891 A1 | 8/2011 | Chen |
| 2011/0211445 A1 | 9/2011 | Chen |
| 2012/0008632 A1 | 1/2012 | Liu et al. |
| 2014/0059216 A1 | 2/2014 | Jerrim |
| 2015/0124830 A1 | 5/2015 | Hu et al. |
| 2015/0146536 A1 | 5/2015 | Minei et al. |
| 2015/0163125 A1 | 6/2015 | Caviglia et al. |
| 2016/0119821 A1 | 4/2016 | Ramachandran et al. |
| 2016/0261494 A1 | 9/2016 | Dai et al. |

OTHER PUBLICATIONS

Coltun, R., et al., "The OSPF Address Resolution Advertisement Option," draft-ieff-ospf-ara-02.txt, Mar. 1998, 40 pages.

Moy, j., "Multicast Extensions to OSPF," RFC 1584, Mar. 1994, 70 pages.

Coltun, R., et al., "The OSPF NSSA Option," RFC 1587, Mar. 1994, 16 pages.

Moy, J., et al., "OSPF Database Overflow," RFC 1765, Mar. 1995, 9 pages.

Moy, J., et al., "Extending OSPF to Support Demand Circuits," RFC 1793, Apr. 1995, 32 pages.

Baker, F., et al., "OSPF Version 2 Management Information Base," RFC 1850, Nov. 1995, 80 pages.

Murphy, S., et al., "OSPF with Digital Signatures," RFC 2154, Jun. 1997, 29 pages.

Moy, J., et al., "OSPF Version 2," RFC 2328, Apr. 1998, 244 pages.

Coltun, R., "The OSPF Opaque LSA Option," RFC 2370, Jul. 1998, 15 pages.

Office Action dated Nov. 23, 2016, 6 pages, U.S. Appl. No. 14/737,142, filed Jun. 11, 2015.

Office Action dated Mar. 1, 2017, 20 pages, U.S. Appl. No. 14/737,142, filed Jun. 11, 2015.

Chen, et al., "Zone Routing System," U.S. Appl. No. 14/737,142, filed Jun. 11, 2016, Specification 43 pages, Drawings 22 pages.

X CHANNEL TO ZONE IN ZONE ROUTING

CROSS-REFERENCE TO RELATED APPLICATIONS

The present application claims priority to U.S. Provisional Patent Application 62/135,015, filed Mar. 18, 2015 by Huaimo Chen and Renwei Li, and entitled "X Channel to Zone in Zone Routing," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Routing is a process of forwarding network traffic to destinations. Source routing is a mechanism that partially or completely specifies, within a source route header, a route that a packet may travel via a network. The source route header may comprise a strict list or a loose list of links and/or nodes to traverse. A strict list explicitly lists all of the links and/or nodes a packet may be transported over, whereas a loose list specifies one or more links and/or nodes that the packet may traverse through to reach a destination, but may not include all the links and/or nodes that a packet may traverse through to reach the destination.

Segment routing (SR) is based on source routing, where a node steers a packet through an ordered list of instructions, called segments. A segment may represent any instruction, and may be topological or service-based. A segment may be identified by a segment label. In an SR network, a route may be formed from a plurality of segments and may be indicated as an ordered list of segment labels in a source route header. SR may be applied to multiprotocol label switching (MPLS) networks and Internet protocol version 6 (IPv6) networks.

SUMMARY

In one embodiment, the disclosure includes an apparatus for zone routing, comprising a transmitter coupled to one or more communication nodes in a network, wherein the communication nodes correspond to less than all edge nodes of the network, a receiver coupled to the communication nodes, and a processor coupled to the transmitter and the receiver, wherein the processor is configured to compute a first path for a label switched path (LSP) through the network, wherein the first path extends from an ingress node of the edge nodes to an egress node of the edge nodes, obtain a second path that traverses through a first communication node of the communication nodes available to the egress node, and send, via the transmitter, a first LSP creation request message to the first communication node requesting creation of the LSP along the first path. In some embodiments, the disclosure also includes wherein the first communication node corresponds to a first of the edge nodes of the network, and/or wherein the first communication node corresponds to an internal node of the network, and/or wherein the processor is further configured to receive an LSP creation response message from a second communication node of the communication nodes, wherein the communication nodes available have third paths from the ingress node of the LSP, wherein the second communication node has a shortest third path from the ingress node, and wherein the LSP creation response message indicates a creation status of the LSP along the first path, and/or wherein the processor is further configured to obtain a global identifier (ID) for identifying the LSP, wherein the LSP creation request message comprises the global ID, send, via the transmitter, an LSP deletion request message to the first communication node requesting deletion of the LSP from the network, wherein the LSP deletion request message comprises the global ID, and receive, via the receiver, an LSP deletion response message from the second communication node indicating a deletion status of the LSP along the first path, and/or wherein the second communication node and the first communication node correspond to a same node in the network, and/or further comprising a memory coupled to the processor and configured to store a routing information base (RIB) identifying one of the communication nodes available as a next-hop node for each of a plurality of fourth paths to nodes in the network, wherein the plurality of paths comprises the second path, and wherein the processor is further configured to determine that the second path is a shortest path among the plurality of fourth paths to the egress node according to the RIB, and select the first communication node according to the shortest path determined from the RIB.

In another embodiment, the disclosure includes a network element (NE) in a zone routing network, comprising a memory configured to store a RIB identifying a first next-hop node for a first path in the network to reach a network controller of the network via a first communication node in the network, wherein the first communication node is directly associated with the network controller, a receiver configured to receive a first LSP creation request message requesting creation of a first LSP through the network, wherein the first LSP creation request message indicates an ingress node of the first LSP, a processor coupled to the memory and the receiver, wherein the processor is configured to determine that the NE corresponds to the ingress node of the first LSP, and a transmitter coupled to the processor and configured to send a first LSP creation response message towards the network controller via the first communication node according to the first path to indicate a creation status of the first LSP, and/or wherein the memory is further configured to store a forwarding information base (FIB) comprising forwarding instructions, wherein the first LSP creation request message is received from a next downstream node along the first LSP, wherein the first LSP creation request message further indicates a global ID identifying the first LSP, a local label associated with the first LSP, and an address of the network controller, and wherein the processor is further configured to generate a FIB entry according to the local label, and generate the first LSP creation response message according to the global ID and the address of the network controller, and/or wherein the receiver is further configured to receive an LSP deletion request message from the next downstream node requesting deletion of the first LSP, wherein the processor is further configured to delete the FIB entry in response to the LSP deletion request message, and wherein the transmitter is further configured to send an LSP deletion response message towards the network controller via the first communication node according to the first path to indicate a deletion status of the first LSP, and/or wherein the memory is further configured to store a FIB comprising forwarding instructions, wherein the receiver is further configured to receive a second LSP creation request message from the first communication node requesting creation of a second LSP through the network, wherein the second LSP creation request message indicates a global ID of the second LSP and an egress node of the second LSP, wherein the processor is further configured to determine that the NE corresponds to the egress node of the second LSP, allocate a local label for the second LSP, generate a FIB entry according to the local label, and generate a third LSP creation request message according to the second LSP creation request message and the local label, and wherein the transmitter is further configured to send the third LSP creation request message to a next upstream node along the second LSP in response to the second LSP creation request message, and/or wherein the receiver is further configured to receive a first LSP deletion request message from the first communication node requesting deletion of the second LSP, wherein the processor is further configured to delete the FIB entry, release the local label, and generate a second LSP deletion request message according to the first LSP deletion request message and the local label, and wherein the transmitter is further configured to send the second LSP deletion request message to the next upstream node in response to the first LSP deletion request message, and/or wherein the receiver is further configured to receive a second LSP creation response message from another NE, wherein the second LSP creation response message is associated with a second LSP, and wherein the transmitter is further configured to send a first acknowledgement to the another NE, and send a third LSP creation response message to the first next-hop node according to the second LSP creation response message, wherein the third LSP creation response message comprises a same content as the second LSP creation response message, and/or wherein the receiver is further configured to receive a first LSP deletion response message from another NE, wherein the first LSP deletion response message is associated with a second LSP, and wherein the transmitter is further configured to send a first acknowledgement to the another NE, and send a second LSP deletion response message to the first next-hop node according to the first LSP deletion response message, wherein the second LSP deletion response message comprises a same content as the first LSP deletion response message, and/or wherein the receiver is further configured to receive a second LSP creation request message from another NE, wherein the second LSP creation request message is associated with a second LSP, wherein the RIB further identifies a second next-hop node for a second shortest path in the network that reaches an egress node of the second LSP, and wherein the transmitter is further configured to send a first acknowledgement to the another NE, and send a third LSP creation request message to the second next-hop node according to the second LSP creation request message, wherein the third LSP creation request message comprises a same content as the second LSP creation request message, and/or wherein the receiver is further configured to receive a first LSP deletion request message from the another NE, and wherein the transmitter is further configured to send a second acknowledgement to the another NE, and send a second LSP deletion request message to the second next-hop node according to the first LSP deletion request message, wherein the second LSP deletion request message comprises a same content as the first LSP deletion request message.

In yet another embodiment, the disclosure includes a method implemented by a network controller in a zone routing network comprising a plurality of edge nodes and one or more communication nodes, the method comprising computing, via a processor of the network controller, a first path through the network for a LSP, wherein the first path extends from an ingress node of the edge nodes to an egress node of the edge nodes, obtaining, via the processor, a second path that traverses through a first communication node of the communication nodes available to the egress node, and sending, via a transmitter of the network controller, a first LSP creation request message to the first communication node requesting creation of the LSP along the first path, wherein the communication are not all the edge nodes. In some embodiments, the disclosure also includes receiving, via a receiver of the network controller, an LSP creation response message from a second communication node of the communication nodes, wherein the communication nodes available have third paths from the ingress node of the LSP, wherein the second communication node has a shortest third path from the ingress node, and wherein the LSP creation response message indicates a creation status of the LSP along the first path, and/or wherein the first communication node corresponds to a first of the edge nodes of the network, and/or wherein the first communication node corresponds to an internal node of the network.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalent.

Figure 1:
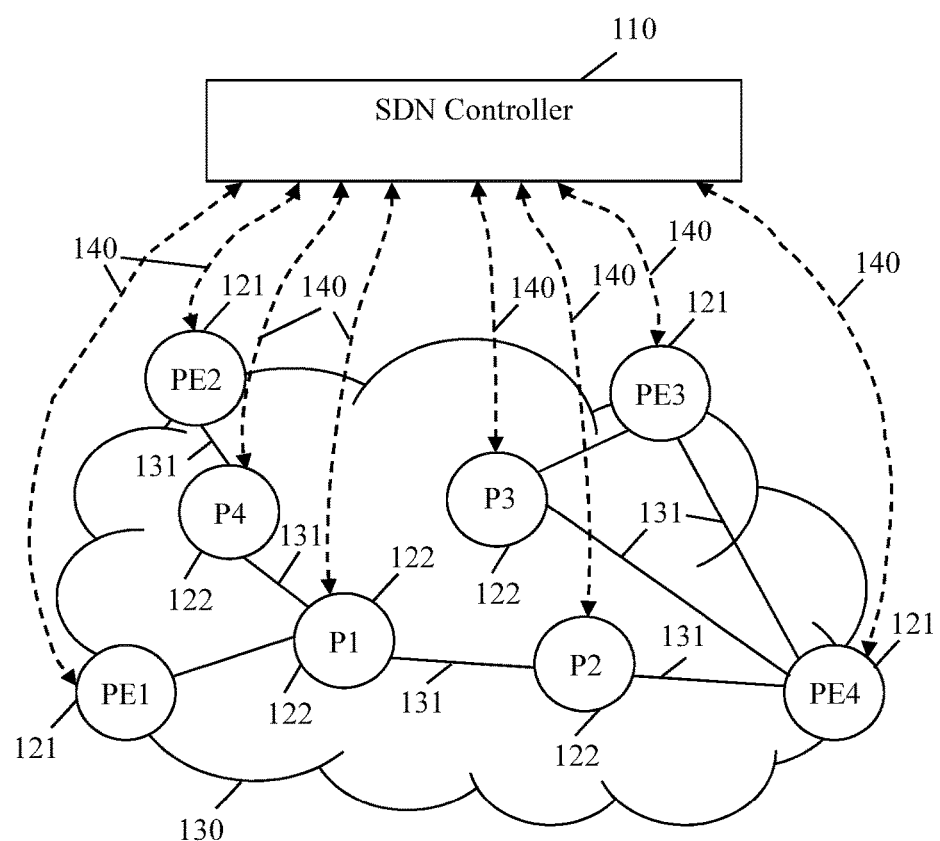
FIG. 1 is a schematic diagram of a software-defined networking (SDN) system.

FIG. 1 is a schematic diagram of an embodiment of an SDN system 100. The system 100 comprises an SDN controller 110 and a network 130. The network 130 comprises a plurality of edge nodes 121, shown as PE1, PE2, PE3, and PE4, and a plurality of internal nodes 122, shown as P1, P2, P3, and P4, interconnected by a plurality of links 131. The edge nodes 121 are located at an edge or a boundary of the network 130. The internal nodes 122 are located within an area of the network 130. The underlying infrastructure of the network 130 may be any types of networks such as an electrical network, an optical network, or combinations thereof. The links 131 may comprise physical links such as fiber optic links, electrical links, wireless links and/or logical links used to transport data in the network 130. The network 130 may operate under a single network administrative domain or multiple network administrative domains. The network 130 may employ any forwarding data plane such as an MPLS forwarding data plane. The SDN controller 110 is communicatively coupled to all edge nodes 121 and all internal nodes 122 of the network 130. The system 100 decouples network control and network forwarding functions.

The SDN controller 110 may be a virtual machine (VM), a hypervisor, or any other device configured to manage and control the network 130. The SDN controller 110 obtains and/or maintains a full topology view of the network 130. The SDN controller 110 computes forwarding paths through the network 130 according to the topology information. For example, the SDN controller 110 may employ a shortest path algorithm to determine a best path between a source-destination pair in the network 130. After computing the forwarding paths, the SDN controller 110 sends forwarding instructions to the edge nodes 121 and the internal nodes 122 to instruct the edge nodes 121 and the internal nodes 122 to forward packets according to the computed forwarding paths. The forwarding instructions may be dependent on the routing protocol. The SDN controller 110 communicates with all edge nodes 121 and all internal nodes 122 via a plurality of communication channels 140. The communication channels 140 are also referred to as controller-network communication channels. In an embodiment, the communication channels 140 are OpenFlow channels as described in the OpenFlow switch specification version 1.5.1 defined by Open Networking Foundation (ONF).

The edge nodes 121 and the internal nodes 122 are software programmable network devices configured to perform forwarding functions in the network 130 according to forwarding instructions received from the SDN controller 110 via the communication channels 140. The edge nodes 121 are further configured to function as access points or interconnection points between the network 130 and other networks, which may be similar to the network 130 or different from the network 130, or other network domains. For example, the edge nodes 121 may establish networking sessions and/or services with different networks, but may not exchange topology information across the different networks.

The decoupling of the control plane from the data plane in SDN networks such as the system 100 allows for centralization of network control, enabling effective policy administration and flexible management. The centralization of network control facilitates various network functionalities, such as network measurements, traffic engineering (TE), enhanced quality of services, and enhanced access control. Thus, many organizations have started to deploy SDN networks. However, the migration of conventional networks to SDN networks may be complex and time consuming. For example, hardware-based network devices are required to be replaced with programmable or software-based network devices. In addition, the number of communication channels such as the communication channels 140 is large in SDN networks.

Figure 2:
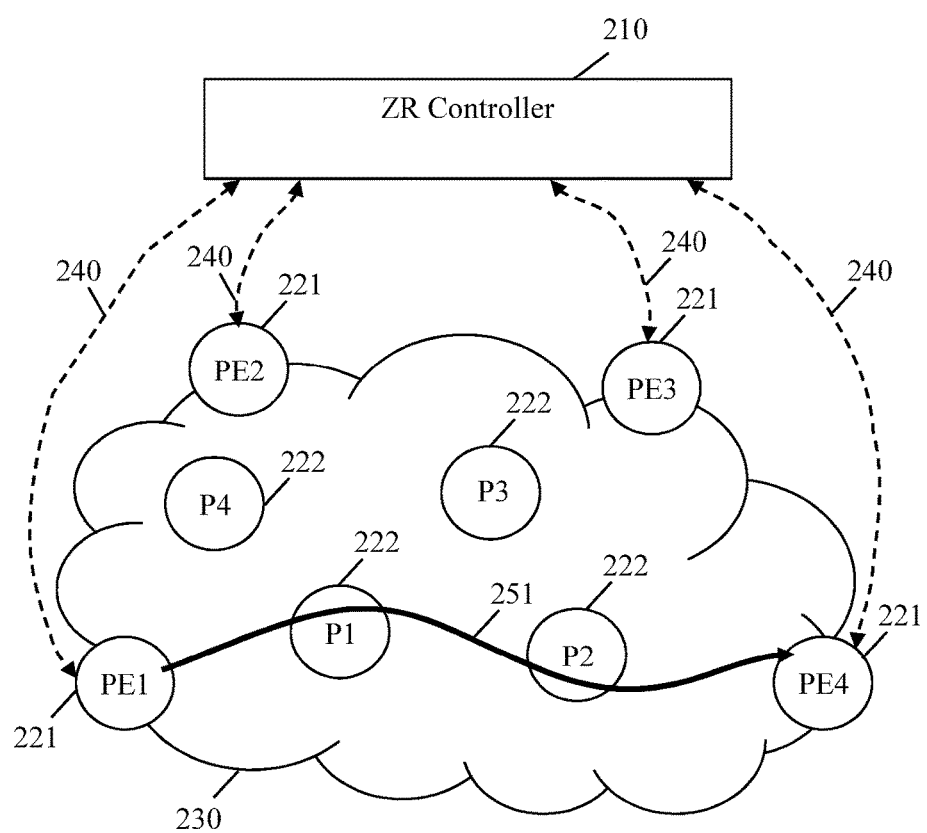
FIG. 2 is a schematic diagram of a zone-edge routing system.

FIG. 2 is a schematic diagram of a zone-edge routing system 200. The system 200 is described in U.S. patent application Ser. No. 14/737,142 by Huaimo Chen, et al., and titled "Zone Routing System," ("'142 application"), which is incorporated by reference. The system 200 is similar to the system 100, but reduces the number of communication channels 140 and only requires upgrades or migration of the edge nodes 121. The system 200 comprises a ZR controller 210 communicatively coupled to a network 230 similar to the network 130 via a plurality of communication channels 240 similar to the communication channels 140. The network 230 comprises a plurality of edge nodes 221, shown as PE1, PE2, PE3, and PE4, and a plurality of internal nodes 222, shown as P1, P2, P3, and P4. The ZR controller 210 performs similar network control and management as the SDN controller 110. The edge nodes 221 and the internal nodes 222 are similar to the edge nodes 121 and the internal nodes 122, respectively. However, the internal nodes 222 do not directly communicate with the ZR controller 210.

In an embodiment, the network 230 employs an MPLS forwarding data plane, where packets are encapsulated with an ordered list of labels identifying a corresponding forwarding path. In such an embodiment, the ZR controller 210 computes shortest paths for LSPs in the network 230 according to certain constraints and maintains information and states associated with the LSPs. The ZR controller 210 communicates with the edge nodes 221 to instruct establishment and tear-down of LSPs across the network 230. Thus, the edge nodes 221 and the internal nodes 222 do not employ any label distribution protocol such as the resource reservation protocol (RSVP) and the label distribution protocol (LDP) that is commonly employed in conventional MPLS networks. In addition, the edge nodes 221 and the internal nodes 222 do not maintain any LSP states. As an example, the ZR controller 210 computes a shortest path for an LSP 251 across the network 230. The LSP 251 begins at the edge node PE1 221, traverses through the internal nodes P1 and P2 222, and ends at the edge node PE4 221. The edge node PE1 221 is referred to as an ingress node or a source node of the LSP 251. The edge node PE4 221 is referred to as an egress node or a destination node of the LSP 251. The internal nodes P1 and P2 222 are referred to as transit nodes of the LSP 251. To create or establish the LSP 251, the ZR controller 210 sends an LSP creation instruction to the edge node PE4 221 corresponding to the egress node of the LSP 251. The edge node PE4 221 initiates creation of the LSP 251 along the path of the LSP 251. When the creation of the LSP 251 is completed, the edge node PE1 221 corresponding to the ingress node of the LSP 251 sends an LSP creation status to the ZR controller 210. The LSP 251 may be deleted by employing similar mechanisms as the creation of the LSP 251.

Although the system 200 reduces the number of communication channels 240 between the ZR controller 210 and the network 230, the system 200 requires the ZR controller 210 to establish the communication channels 240 with all edge nodes 221. In order to support communication with the ZR controller 210, all edge nodes 221 are required to be updated to programmable network devices.

Disclosed herein are various embodiments of an efficient and flexible ZR-X scheme. The ZR-X scheme enables a user or a network administrator to configure a ZR controller to establish x number of controller-network communication channels with x number of suitable nodes in a network, where x is any positive integer. The nodes that are in direct communication with the ZR controller are referred to as communication nodes. In contrast to the system 200, the communication nodes correspond to less than all the edge nodes in the network and the communication nodes may include edge nodes and/or internal nodes of the network. The ZR controller computes paths for LSPs in the network and maintains information and states associated with the LSPs. The ZR controller sends LSP creation request messages to the communication nodes, which forward the LSP creation request messages to corresponding egress nodes of the LSP. The egress nodes of the LSPs initiate creation of the LSP along upstream nodes of the LSP. The ingress nodes of the LSPs send LSP creation response messages to the ZR controller via the communication nodes that are closest to corresponding ingress nodes. Thus, label distribution protocols such as LDP and RSVP are not employed by any node in the network. In an embodiment, each node in the network comprises a routing information base that indicates forwarding paths to the network controller via a communication node and to other nodes in the network. To prevent the network controller from participating in data traffic forwarding, the cost of the paths to the network controller are set to a maximum value or a value greater than rest of the paths to the other nodes in the network. The disclosed embodiments provide several benefits such as low complexity in controller-node operations, simple controller implementations, easy scalability to support a large-scale network, simple migration with little or no service interruption, and low packet overhead. In addition, the disclosed embodiments are suitable for creating and deleting point-to-multipoint (P2MP) LSPs.

Figure 3:
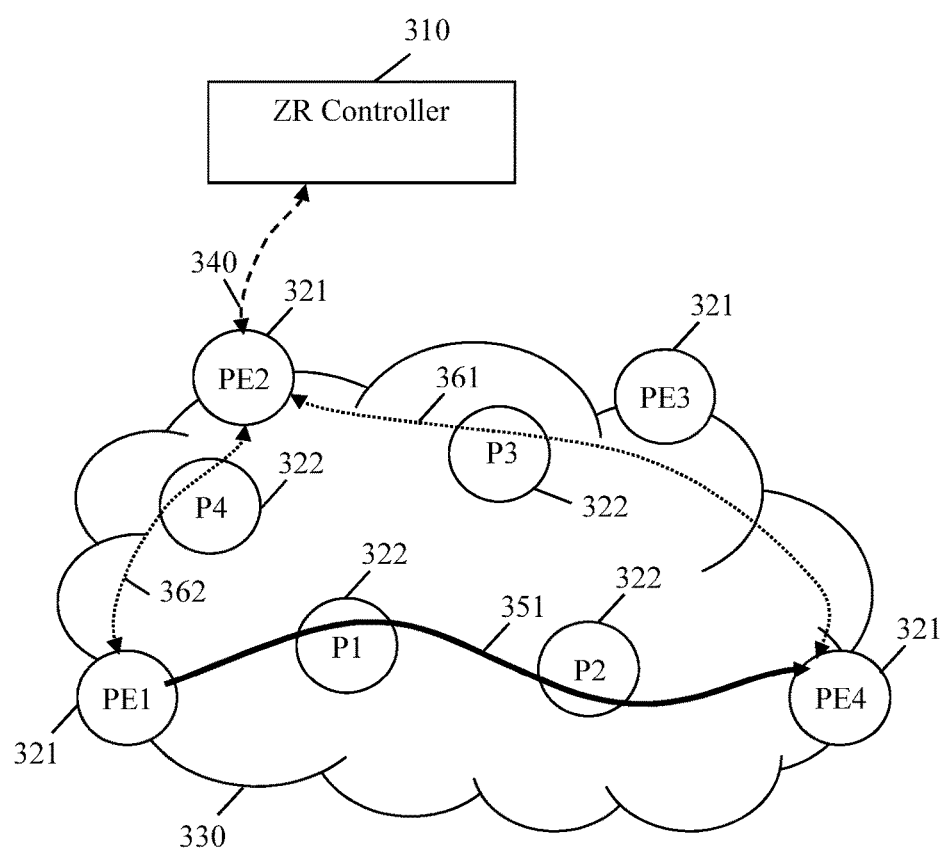
FIG. 3 is a schematic diagram of a single-channel zone routing (ZR-1) system according to an embodiment of the disclosure.

FIG. 3 is a schematic diagram of a ZR-1 system 300 according to an embodiment of the disclosure. In contrast to the system 200, the system 300 employs a single communication channel 340 for network control and management instead of multiple communication channels 240 to all edge nodes 221. The system 300 comprises a ZR controller 310 similar to the ZR controller 210 communicatively coupled to a network 330 similar to networks 130 and 230 via the single communication channel 340 similar to the communication channels 140 and 240. The network 330 comprises a plurality of edge nodes 321, shown as PE1, PE2, PE3, and PE4, and a plurality of internal nodes 322, shown as P1, P2, P3, and P4. The edge nodes 321 are similar to the edge nodes 121 and 221, but only a single edge node PE2 321 is in direct communication with the ZR controller 310 via the communication channel 340. Thus, the edge node PE2 321 functions as a single communication node in the network 330. The internal nodes 322 are similar to the internal nodes 122 and 222. Similar to the network 220, the ZR controller 310 computes shortest paths for LSPs in the network 330 according to certain constraints and maintains information and states associated with the LSPs. However, the ZR controller 310 communicates with the communication node (e.g., PE2 321) for all LSP creations and deletions.

As an example, the ZR controller 310 computes a shortest path for an LSP 351 across the network 330. The LSP 351 begins at the edge node PE1 321, traverses through the internal nodes P1 and P2 322, and ends at the edge node PE4 321. To create the LSP 351, the ZR controller 310 sends an LSP creation instruction to the edge node PE2 321 corresponding to the communication node in the network 330 via the communication channel 340. The edge node PE2 321 forwards the LSP creation instruction to the edge node PE4 321 corresponding to an egress node of the LSP 351 via a network path 361, which may comprise one or more hops or links such as the links 131. The edge node PE4 321 initiates creation of the LSP 351 along the path of the LSP 351.

When the creation of the LSP 351 is completed, the edge node PE1 321 corresponding to an ingress node of the LSP 351 sends an LSP creation status to the ZR controller 310. For example, the edge node PE1 321 comprises an RIB that includes a route to the ZR controller 310 through the internal node P4 322. The internal node P4 322 comprises an RIB that includes a route to the ZR controller 310 through the edge node PE2 321. Thus, the edge node PE1 321 sends the LSP creation status to the edge node PE2 321 along the network path 362. Subsequently, the edge node PE2 321 forwards the LSP creation status to the ZR controller 310 via the communication channel 340. The LSP 351 may be deleted by employing similar mechanisms as the creation of the LSP 351. The creation and deletion of LSPs are described more fully below. It should be noted that the edge nodes 321 and the internal nodes 322 do not employ any label distribution protocol and do not maintain LSP states. In addition, each edge node 321 may comprise a RIB that includes a route to the ZR controller 310, but the ZR controller 310 is excluded from data forwarding functions, as described more fully below.

Figure 4:
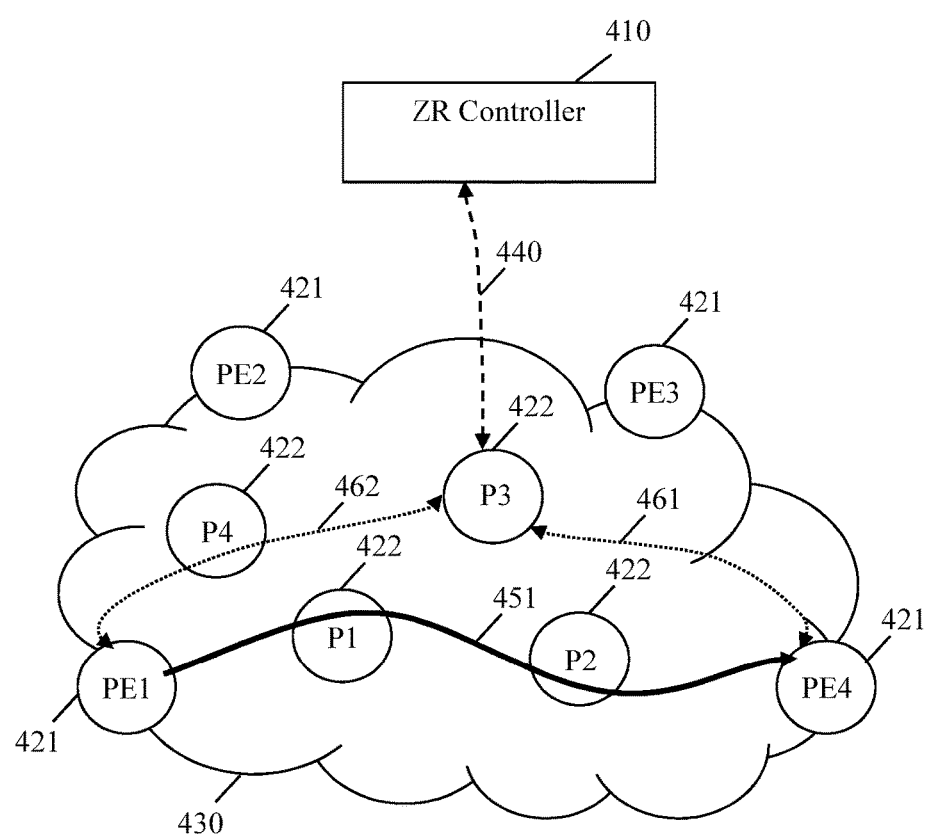
FIG. 4 is a schematic diagram of a ZR-1 system according to another embodiment of the disclosure.

FIG. 4 is a schematic diagram of a ZR-1 system 400 according to another embodiment of the disclosure. The system 400 is similar to the system 300, but employs a single communication channel 440 between a ZR controller 410 and an internal node 422 of a network 430 instead of an edge node 421 of the network 430. The ZR controller 410 is similar to the ZR controllers 210 and 310. The network 430 is similar to the networks 130, 230, and 330. The edge nodes 421 are similar to the edge nodes 121, 221, and 321 and the internal nodes 422 are similar to the internal nodes 122, 222, and 322. However, only a single internal node P3 422 is in direct communication with the ZR controller 410. The communication channel 440 is similar to the communication channels 140, 240, and 340. The creation and deletion of an LSP 451 from the edge node PE1 421 to the edge node PE4 421 are similar to the LSP 351. However, the ZR controller 410 sends LSP creation and deletion instructions to the internal node P3 422 corresponding to a communication node in the network 430. The internal node P3 422 forwards the LSP creation and deletion instructions to the edge node PE4 421 corresponding to an egress node of the LSP 451 via a network path 461 similar to the network paths 361 and 362. Upon completion of an LSP creation or deletion, the edge node PE1 421 corresponding to an ingress node of the LSP 451 sends a status to the ZR controller 410 via the internal node P3 422 along a network path 462 similar to the network paths 361, 362, and 461.

Figure 5:
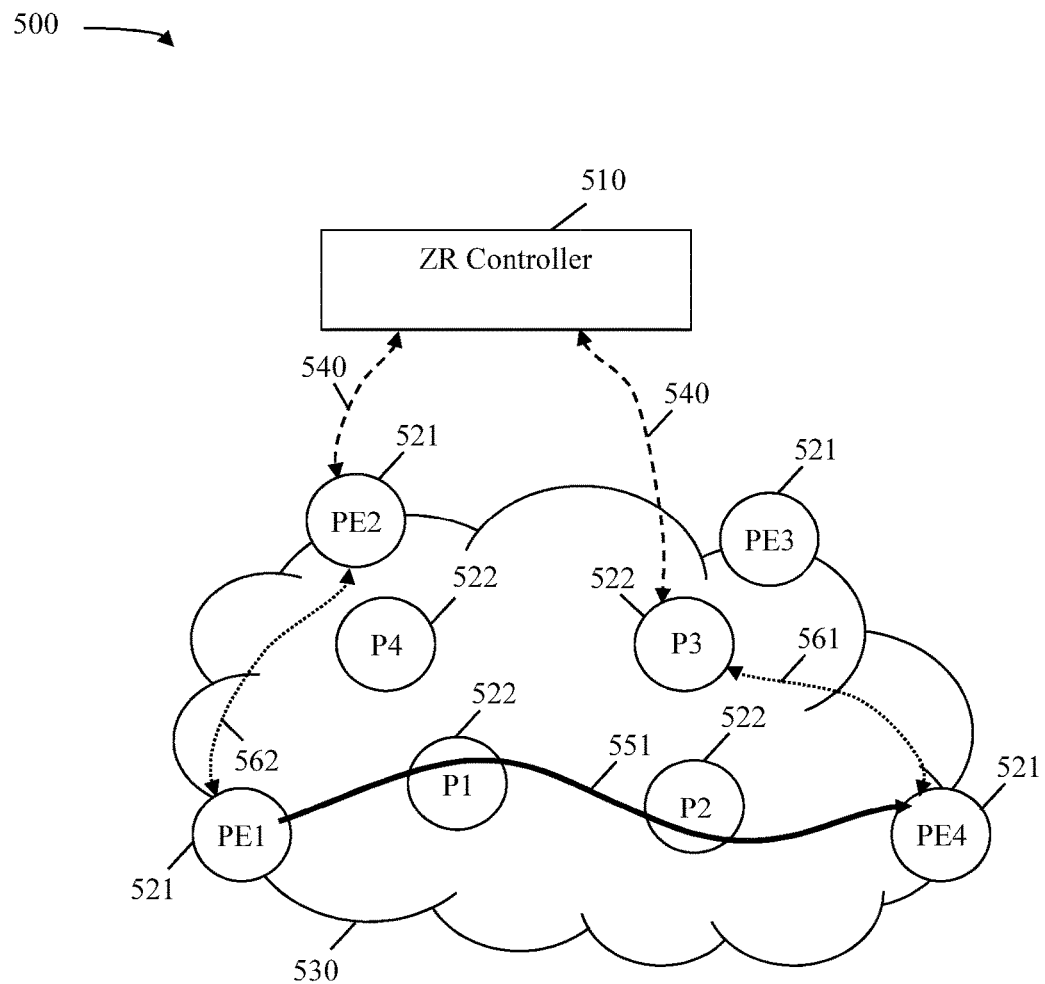
FIG. 5 is a schematic diagram of an x-channel zone routing (ZR-X) system according to an embodiment of the disclosure.

FIG. 5 is a schematic diagram of an embodiment of a ZR-X system 500 according to an embodiment of the disclosure. The system 500 is similar to the systems 300 and 400, but employs x number of communication channels 540 to control and manage a network 530, where x may be any positive integer number. For illustration purposes, the system 500 comprises two communication channels 540, where x equals to 2. As shown, the system 500 comprises a ZR controller 510 in data communication with an edge node 521 and an internal node 522 in the network 530 via the communication channels 540. The ZR controller 510 is similar to the SDN controller 110 and the ZR controllers 210, 310, and 410. The network 530 is similar to the networks 130, 230, 330, and 430. The edge nodes 521 are similar to the edge nodes 121, 221, 321, and 421. The internal nodes 522 are similar to the internal nodes 122, 222, 322, and 422. The communication channels 540 are similar to the communication channels 140, 240, 340, and 440. The creation and deletion of an LSP 551 from the edge node PE1 521 to the edge node PE4 521 are similar to the LSPs 351 and 451. However, the ZR controller 510 selects a communication node that is a next-hop node of the shortest route to the edge node PE4 521 corresponding to an egress node of the LSP 551. For example, the internal node P3 522 is a node closest to the edge node PE4 521 among all communication nodes. A closest node refers to a node through which the path from the ZR controller 510 to a destination node has a shortest distance. Thus, the ZR controller 510 sends LSP creation and deletion instructions to the internal node P3 522. Subsequently, the internal node P3 522 forwards the LSP creation and deletion instructions to the edge node PE4 521 via a network path 561 similar to the network paths 361, 362, 461, and 462. When the creation or deletion of the LSP 551 is completed, the edge node PE1 521 corresponding to an ingress node of the LSP 551 sends a status to the ZR controller 510. The edge node PE1 521 looks up an RIB for a shortest route to the ZR controller 510. For example, the edge node PE2 521 is a node that is closest to the edge node PE1 521 among all communication nodes in the network 530. Thus, the route may include a network path 562 similar to the network paths 361, 362, 461, 462, and 561 to the edge node PE2 521. Subsequently, the edge node PE2 521 forwards the status to the ZR controller 510 via a corresponding communication channel 540. The creation and deletion of LSPs are described more fully below.

In an embodiment, each edge node 521 comprises an RIB that identifies routes to reach every other edge nodes 521, the internal nodes 522, and the ZR controller 510. The routes to the ZR controller 510 traverse one of the communication nodes, which may be the edge node PE2 521 or the internal node P3 522. In order to prevent the ZR controller 510 from participating in data forwarding functions in the network 530, the segment of the routes between the ZR controller 510 and the communication nodes corresponding to the communication channels 540 are configured with a maximum path cost. Thus, the routes to the ZR controller 510 are automatically excluded during data forwarding.

In contrast to the system 200, the system 500 allows the number of communication channels 540 to the network 530 to be configurable. In addition, the ZR controller 510 may establish the communication channels 540 with any nodes, which may include an edge node 521 and/or an internal node 522 in the network 530, but not all edge nodes 521 as in the system 200. For example, a user or a network administrator may configure the number of communication channels 540 and select suitable nodes in the network 530 as communication nodes. It should be noted that the system 500 may be configured as shown or alternatively configured as determined by a person of ordinary skill in the art to achieve similar functionalities.

Figure 6:
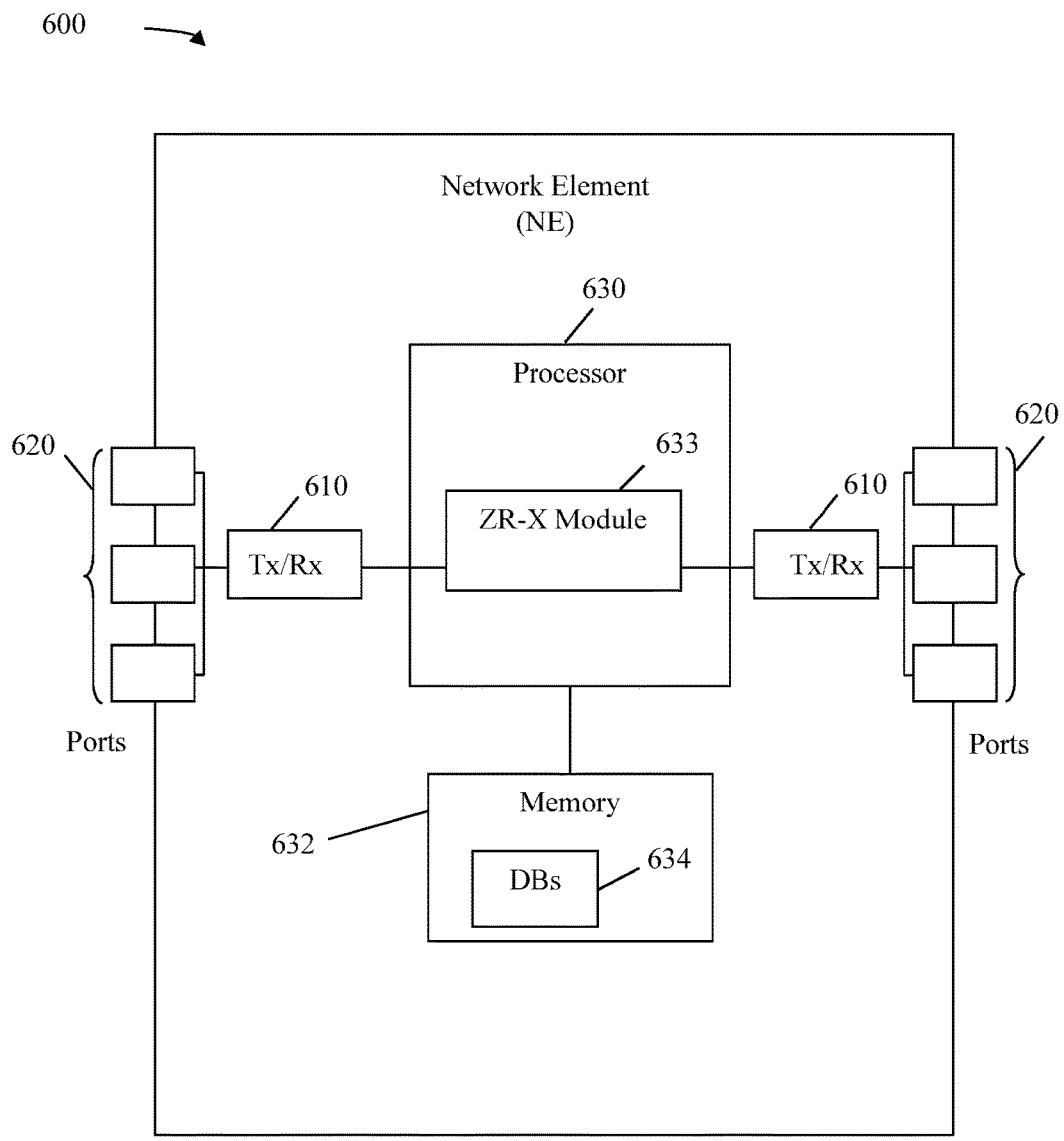
FIG. 6 is a schematic diagram of an embodiment of a network element (NE) according to an embodiment of the disclosure.

FIG. 6 is a schematic diagram of an embodiment of an NE 600, such as ZR controllers 310, 410, and 510, the edge nodes 321, 421, and 521, and the internal nodes 322, 422, and 522 in the systems 300, 400, and 500 according to an embodiment of the disclosure. NE 600 may be configured to implement and/or support the zone routing mechanisms and schemes described herein. NE 600 may be implemented in a single node or the functionality of NE 600 may be implemented in a plurality of nodes. One skilled in the art will recognize that the term NE encompasses a broad range of devices of which NE 600 is merely an example. NE 600 is included for purposes of clarity of discussion, but is in no way meant to limit the application of the present disclosure to a particular NE embodiment or class of NE embodiments.

At least some of the features/methods described in the disclosure are implemented in a network apparatus or component such as an NE 600. For instance, the features/methods in the disclosure may be implemented using hardware, firmware, and/or software installed to run on hardware. The NE 600 is any device that transports packets through a network, e.g., a switch, router, bridge, server, a client, etc. As shown in FIG. 6, the NE 600 comprises transceivers (Tx/Rx) 610, which may be transmitters, receivers, or combinations thereof. The Tx/Rx 610 is coupled to a plurality of ports 620 for transmitting and/or receiving frames from other nodes.

A processor 630 is coupled to each Tx/Rx 610 to process the frames and/or determine which nodes to send the frames to. The processor 630 may comprise one or more multi-core processors and/or memory devices 632, which may function as data stores, buffers, etc. The processor 630 may be implemented as a general processor or may be part of one or more application specific integrated circuits (ASICs) and/or digital signal processors (DSPs).

The processor 630 comprises a ZR-X module 633, which may perform path computation, network control, data forwarding, LSP creations, LSP deletions, and LSP states maintenance depending on the embodiments and may implement methods 800, 900, 1000, 1100, 1200, 1300, 1400, 1500, 1600, and 1700, as discussed more fully below, and/or any other flowcharts, schemes, and methods discussed herein. As such, the inclusion of the ZR-X module 633 and associated methods and systems provide improvements to the functionality of the NE 600. Further, the ZR-X module 633 effects a transformation of a particular article (e.g., the network) to a different state. In an alternative embodiment, the ZR-X module 633 may be implemented as instructions stored in the memory devices 632, which may be executed by the processor 630.

The memory device 632 may comprise a cache for temporarily storing content, e.g., a random-access memory (RAM). Additionally, the memory device 632 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The memory device 632 may be configured to store one or more databases (DBs) 634 associated with ZR-X such as RIBS, forwarding information bases (FIBs), and LSP databases (LSPDBs), as described more fully below.

It is understood that by programming and/or loading executable instructions onto the NE 600, at least one of the processor 630 and/or memory device 632 are changed, transforming the NE 600 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions (e.g., a computer program product stored in a non-transitory medium/memory) may be viewed as a particular machine or apparatus.

Figure 7:
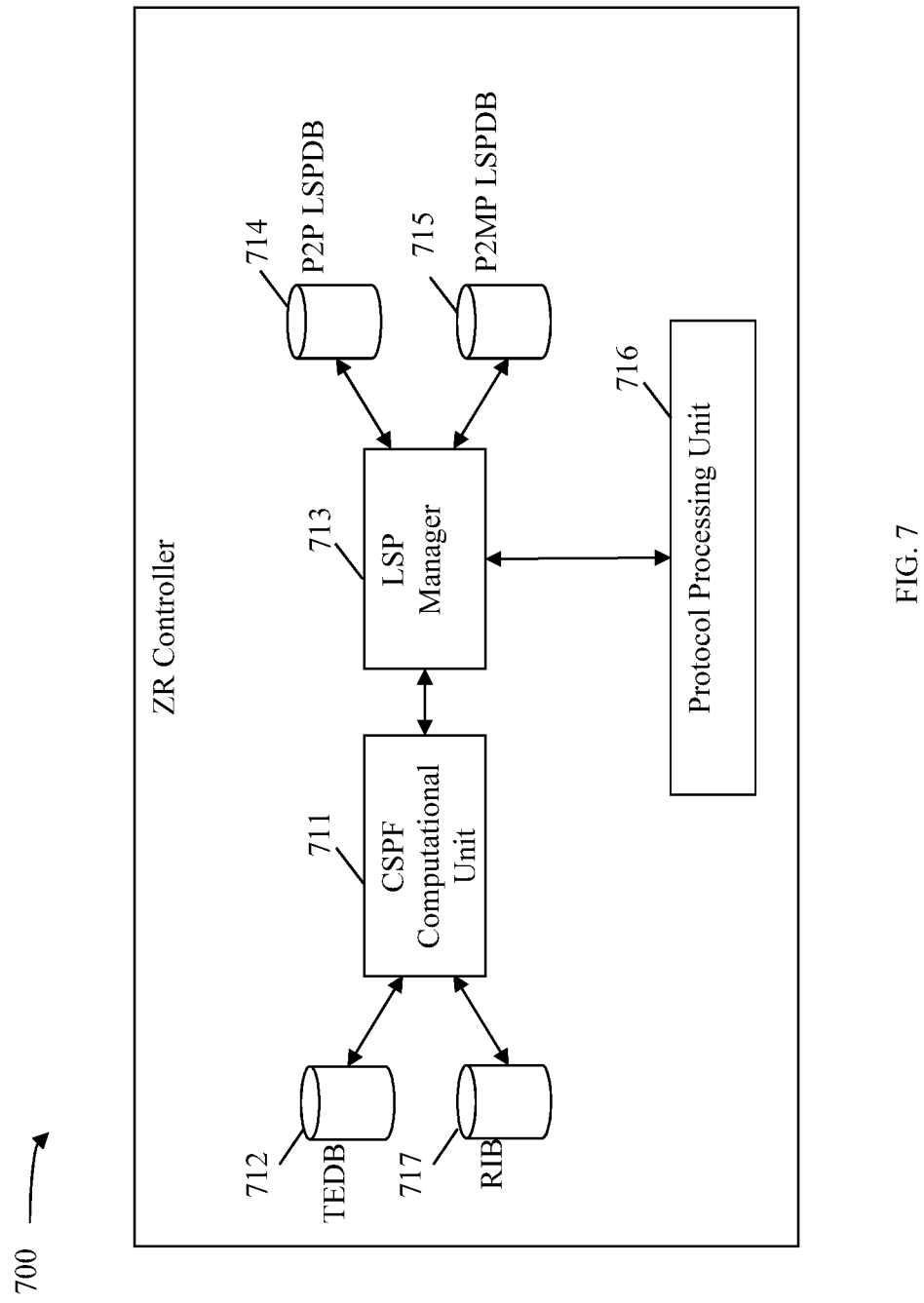
FIG. 7 is a schematic diagram of a ZR controller according to an embodiment of the disclosure.

FIG. 7 is a schematic diagram of a ZR controller 700 according to an embodiment of the disclosure. The ZR controller 700 is employed by the systems 300, 400, and 500. The ZR controller 700 is similar to the ZR controllers 310, 410, and 510 and provides a more detailed view of the ZR controllers 310, 410, and 510. The ZR controller 700 may be implemented using software and/or hardware and may be similar to the NE 600. The ZR controller 700 comprises a constrained shortest path first (CSPF) computational unit 711, a TE database (TEDB) 712, an LSP manager 713, a P2P LSP database (LSPDB) 714, a P2MP LSPDB 715, an RIB 717, and a protocol processing unit 716. The LSP manager 713 is coupled to the CSPF computational unit 711, the P2P LSPDB 714, the P2MP LSPDB 715, and the protocol processing unit 716. The CSPF computational unit 711 is coupled to the TEDB 712 and the RIB 717.

The CSPF computational unit 711 is configured to compute routing paths through a network such as the networks 130, 230, 330, 430, and 530 based on certain constraints. The CSPF computational unit 711 may employ a CSPF algorithm. The TEDB 712 is configured to store network resource information of the network. For example, the TEDB 712 is stored in a memory device such as the memory device 632. Some examples of network resource information includes bandwidths, delays, data rates, link types, statuses, and/or any other information associated with the network. For example, the CSPF computational unit 711 consults with the TEDB 712 when performing path computations. In some embodiments, the CSPF computational unit 711 and the TEDB 712 are located external to the ZR controller 700 and the TEDB 712 is managed by a TEDB manager. The RIB 717 is configured to store routes in the network. For example, the ZR controller 700 comprises a global topology view of the network with routes to reach every node such as the edge nodes 121, 221, 321, 421, and 521 and the internal nodes 122, 222, 322, 422, and 522 in the network.

The P2P LSPDB 714 is configured to store global identifiers (IDs) and path information associated with P2P LSPs such as the LSPs 251, 351, 451, and 551 in the network. The P2MP LSPDB 715 is configured to store global IDs and path information associated with P2MP LSPs in the network. For example, the P2P LSPDB 714 and the P2MP LSPDB 715 are stored in the memory device. A P2P LSP comprises a single ingress node and a single egress node in the network, whereas a P2MP LSP comprises a single ingress node and multiple egress nodes in the network zone. Each P2P LSP or P2MP LSP in the network is identified by a unique global ID. In an embodiment, the P2P LSPDB 714 reserves a first range of global IDs for P2P LSP allocations and the P2MP LSPDB 715 reserves a second range of global IDs for P2MP LSP allocations, where the first range and the second range of global IDs are non-overlapping global IDs. When a global ID is allocated to a particular P2P LSP or P2MP LSP, the path information associated with the particular P2P LSP is stored in the P2P LSPDB 714 or the P2MP LSPDB 715, respectively. The path information includes a node sequence for the LSP, a path state of the LSP, and network resources reserved for the LSP. For example, a node sequence for the LSP 551 is stored in the form of {PE4←P2←P1←PE1} to indicate that the LSP 551 traverses from the edge node PE1 521, followed by the internal nodes P1 and P2 522, and to the edge node PE4 521. In some embodiments, the P2P LSPDB 714 and/or the P2MP LSPDB 715 are located externally from the ZR controller 710 and are managed by an LSPDB manager.

The protocol processing unit 716 is configured to communicate with communication nodes such as the edge node PE2 321 in the system 300, the internal node P3 422 in the system 400, and the edge node PE2 521 and the internal node P3 522 in the system 500. For example, the protocol processing unit 716 may implement an interior gateway protocol (IGP) or a border gateway protocol (BGP) with extensions, as discussed more fully below.

The LSP manager 713 is configured to manage and control P2P LSPs and P2M LSPs in the network. The LSP manager 713 coordinates with the CSPF computational unit 711 to compute paths through the network, for example, based on requests from users and/or applications. The LSP manager 713 obtains or allocates global IDs from the P2P LSPDB 714 for P2P LSPs. The LSP manager 713 obtains or allocates global IDs from the P2MP LSPDB 715 for P2MP LSPs. The LSP manager 713 communicates with the communication nodes of the network via the protocol processing unit 716 to create and/or delete LSPs. To create and/or delete an LSP, the LSP manager 713 sends a request to a communication node closest to an egress node of the LSP and receives a response from an ingress node of the LSP via a communication node closest to the ingress node. An LSP creation and/or deletion request includes a global ID of an LSP, a node sequence in the LSP, and/or other path information associated with the LSP. An LSP creation and/or deletion response includes a global ID of an LSP and a state of the LSP. When LSPs are created and/or deleted in the network, the LSP manager 713 tracks and maintains global IDs, statuses, and/or states of the LSPs.

Figure 8:
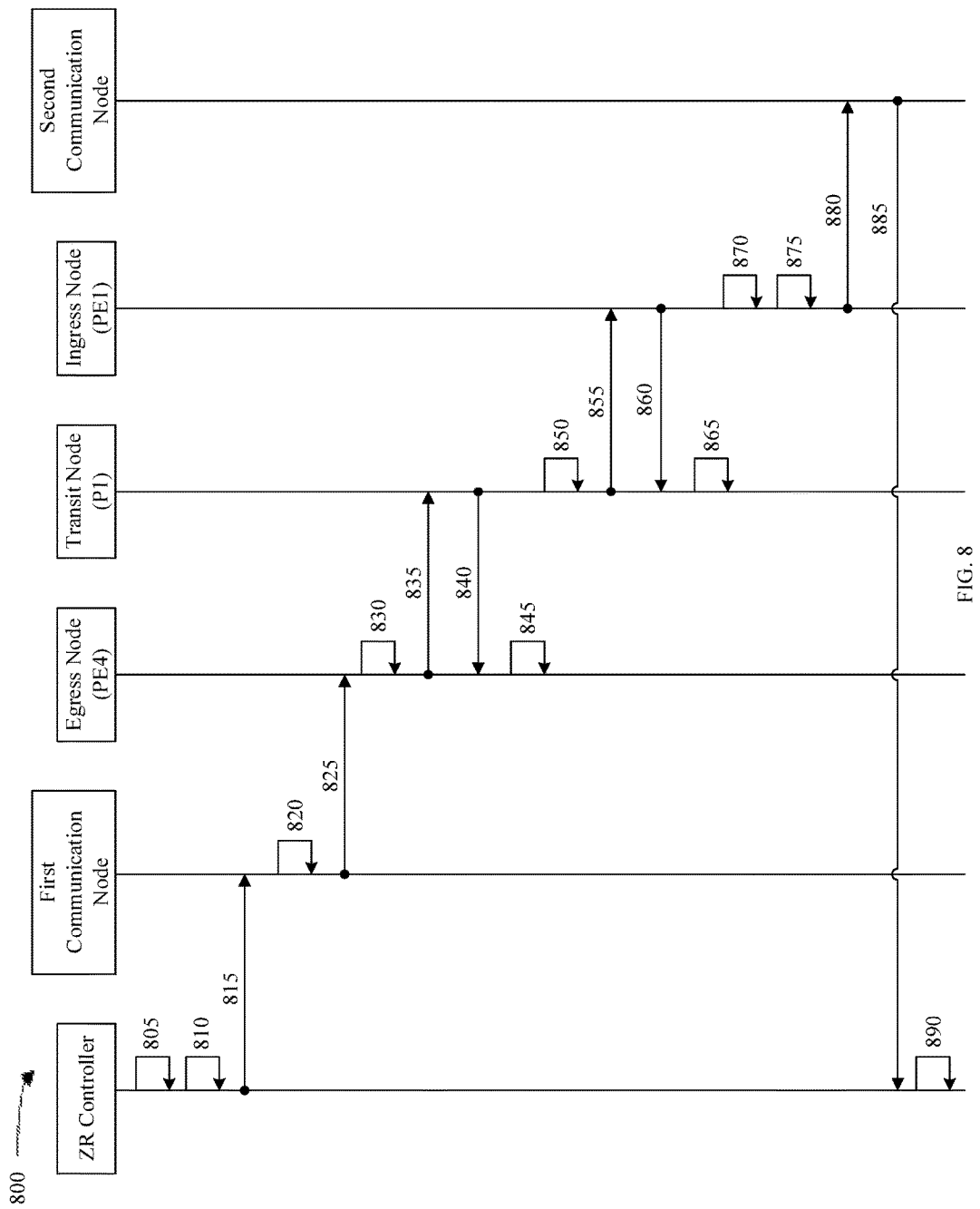
FIG. 8 is a protocol diagram of a method for creating a point-to-point (P2P) label-switched path (LSP) according to an embodiment of the disclosure.

FIG. 8 is a protocol diagram of an embodiment of method 800 for creating a P2P LSP such as the LSPs 351, 451, and 551 in a ZR system such as the systems 300, 400, and 500. The method 800 is implemented between a ZR controller, a first communication node of the network, an egress node PE4 of an LSP, a transit node P1 of the LSP, an ingress node PE1 of the LSP, and a second communication node of the network. The ZR controller is similar to the ZR controllers 310, 410, 510, and 700. The first and second communication nodes are in direct association or communication with the ZR controller via communication channels similar to the communication channels 140, 240, 340, 440, and 540. For example, the first and the second communication nodes correspond to the edge nodes PE2 321 and 521 and the internal nodes P3 422 and 522. The method 800 is implemented when the ZR controller receives an LSP request from a user or an application. For example, the user or the application requests an LSP for forwarding a data flow or a traffic class, which may be represented by an FEC or an interface index. At step 805, the ZR controller obtains a path for the LSP. The path traverses from the ingress node PE1 to the egress node PE4 through the transit node P1 (e.g., {PE4←P1←PE1}). For example, the path is computed by a CSPF computational unit such as the CSPF computational unit 711 of the ZR controller. After obtaining the path, the ZR controller obtains a global ID (e.g., LSP-ID) for the LSP. For example, the global ID is allocated from a P2P LSPDB such as the P2P LSPDB 714.

At step 810, the ZR controller determines that the first communication node is a next-hop node or a closest node to the egress node PE4 among all communication nodes. For example, the ZR controller selects the first communication node based on routing information stored in an RIB such as the RIB 717. At step 815, the ZR controller sends a first LSP creation request to the first communication node. The first LSP creation request includes the LSP-ID, a node sequence along the path of the LSP, which may be represented by {PE4←P1←PE1}, the LSP traffic class, and the ZR controller address. At step 820, upon receiving the first LSP creation request, the first communication node determines that it is not the egress node PE4. At step 825, the first communication node forwards the first LSP creation request to the egress node PE4.

At step 830, upon receiving the first LSP creation request, the egress node PE4 allocates a local label (e.g., L4), records the local label under the LSP-ID, and creates an FIB entry (e.g., (L4, pop)) to facilitate subsequent packet forwarding along the LSP. The FIB entry may be stored in local memory such as the memory device 632. For example, when the egress node PE4 receives a packet, the egress node PE4 determines a forwarding port according to the FIB. When the packet is attached with a label L4, the egress node PE4 removes the label L4 and forwards the packet to the destination of the packet.

At step 835, the egress node PE4 sends a second LSP creation request to the transit node P1 (e.g., a next upstream node along the path). The second LSP creation request includes the L4, LSP-ID, the traffic class, remaining hops in the path (e.g., {P1←PE1}), the LSP traffic class, and the ZR controller address. The egress node PE4 may store the second LSP creation request in the memory until the transit node P1 acknowledges the reception of the second LSP creation request.

At step 840, upon receiving the second LSP creation request from the egress node PE4, the transit node P1 sends a first acknowledgement to the egress node PE4 to acknowledge the reception of the second LSP creation request. At step 845, upon receiving the first acknowledgement, the egress node PE4 flushes the second LSP creation request from the memory.

At step 850, in response to the second LSP creation request, the transit node P1 allocates a local label (e.g., L1), records L1 under LSP-ID, and creates an FIB entry (e.g., (L1, L4)) to facilitate subsequent packet forwarding to the egress node PE4. For example, when the transit node P1 receives a packet with a label L1, the transit node P1 removes the label L1, attaches a label L4 to the packet, and forwards the packet to the egress node PE4.

At step 855, the transit node P1 sends a third LSP creation request to the ingress node PE1 (e.g., a next upstream node along the path). The third LSP creation request includes L1, LSP-ID, remaining hops in the path (e.g., {PE1}), the LSP traffic class, and the ZR controller address. Similarly, the transit node P1 may store the third LSP creation request in local memory until the ingress node PE1 acknowledges the reception of the third LSP creation request.

At step 860, upon receiving the third LSP creation request from the transit node P1, the ingress node PE1 sends a second acknowledgement to the transit node P1 to acknowledge the reception of the third LSP creation request. At step 865, upon receiving the second acknowledgement from the ingress node PE1, the transit node P1 flushes the third LSP creation request from the memory.

At step 870, in response to the third LSP creation request, the ingress node PE1 creates an FIB entry (e.g., traffic class, push L1) to facilitate subsequent packet forwarding to the transit node P1. For example, when the ingress node PE1 receives a packet corresponding to the traffic class, the ingress node PE1 pushes or attaches the label L1 to the packet and forwards the packet to the transit node P1.

At step 875, the ingress node PE1 looks up a route for sending a response to the ZR controller. The response includes the global ID and a creation status of the LSP. For example, the route indicates the second communication node as a next-hop node. At step 880, the ingress node PE1 sends the response to the second communication node. At step 885, the second communication node forwards the response to the ZR controller. At step 890, upon receiving the response, the ZR controller updates the P2P LSPDB according to the received response.

Although the method 800 is illustrated with a single transit node between the egress node PE4 and the ingress node PE1, the method 800 may be employed to create LSPs with any number of transit nodes, which perform similar operations as the transit node P1. In addition, the method 800 may be employed to create a P2MP LSP. To create P2MP LSP, the ZR controller sends an LSP creation request to each egress node (e.g., destination node) of the P2MP LSP. It should be noted that the first and the second acknowledgements at steps 840 and 860 and/or the flushing of the second and third LSP creation requests at steps 845 and 865 may be optional in some embodiments. In addition, the first communication node and the second communication node may be the same node. Further, the first communication node may correspond to the egress node or the ingress node. Similarly, the second communication node may correspond to the egress node or the ingress node.

Figure 9:
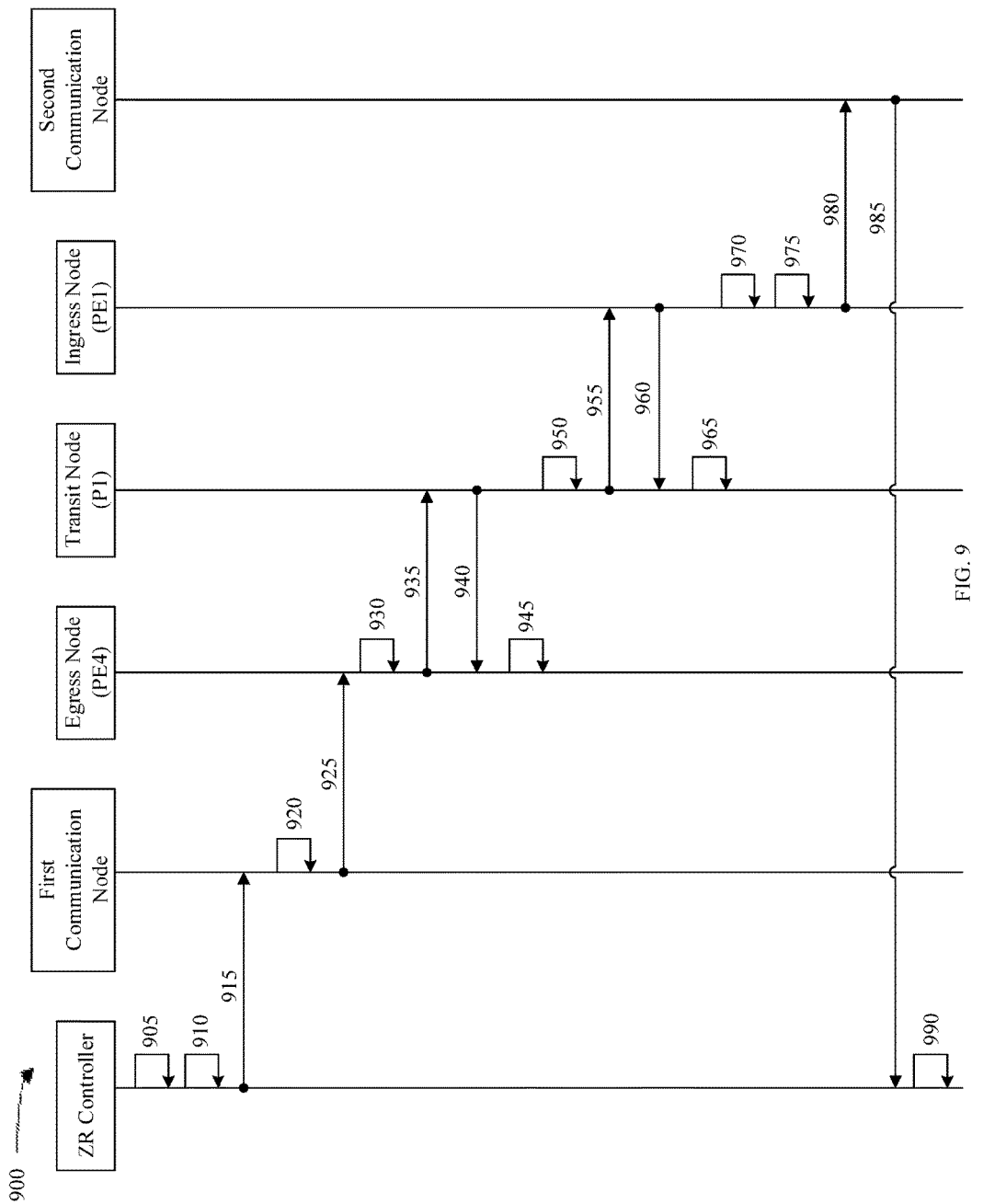
FIG. 9 is a protocol diagram of a method for deleting a P2P LSP according to an embodiment of the disclosure.

FIG. 9 is a protocol diagram of an embodiment of a method 900 for deleting a P2P LSP, such as the LSP 351. The method 900 is implemented between a ZR controller, a first communication node of the network, an egress node PE4 of an LSP, a transit node P1 of the LSP, an ingress node PE1 of the LSP, and a second communication node of the network. The ZR controller is similar to the ZR controllers 310, 410, 510, and 700. The first and second communication nodes are in direct communication or association with the ZR controller via communication channels similar to the communication channels 140, 240, 340, 440, and 540. For example, the first and the second communication nodes correspond to the edge nodes PE2 321 and 521 and the internal nodes P3 422 and 522. The method 900 is implemented after an LSP is created by employing the method 800. For example, the LSP is identified by a global ID (e.g., LSP-ID) and traverses from the ingress node PE1 to the egress node PE4 through the transit node P1 (e.g., {PE4←P1←PE1}). The egress node PE4 comprises an FIB entry, (L4, pop), for data forwarding along the LSP, where L4 is a local label allocated by the egress node PE4 and recorded under LSP-ID. The transit node P1 comprises an FIB entry, (L1, L4), for data forwarding along the LSP, where L1 is a local label allocated by the transit node P1 and recorded under LSP-ID. The ingress node PE1 comprises an FIB entry, (traffic class, push L1), for data forwarding along the LSP. Each of the egress node PE4, the transit node P1, and the ingress node PE1 may store the FIB entry, the global ID, and/or the local label in local memory such as the memory device 632.

At step 905, the ZR controller determines to delete the LSP based on a user request or an application request. At step 910, the ZR controller determines that the first communication node is a next-hop node or a closest node to the egress node PE4 among all communication nodes. For example, the ZR controller selects the first communication node based on routing information stored in an RIB such as the RIB 717. At step 915, the ZR controller sends a first LSP deletion request to the first communication node. The first LSP deletion request includes the global LSP-ID, a node sequence, {PE4←P1←PE1}, for the LSP, and the ZR controller address.

At step 920, upon receiving the first LSP deletion request, the first communication node determines that it is not the egress node PE4. At step 925, the first communication node forwards the first LSP deletion request to the egress node PE4.

At step 930, upon receiving the first LSP deletion request, the egress node PE4 releases L4 recorded under LSP-ID and removes the FIB entry, (L4, pop). At step 935, the egress node PE4 sends a second LSP deletion request to the transit node P1 (e.g., a next upstream node along the LSP) requesting deletion of the LSP. The second LSP deletion request includes L4, LSP-ID, and the remaining hops in the LSP (e.g., {P1←PE1}). The egress node PE4 may store the second LSP deletion request in the local memory until the transit node P1 acknowledges the reception of the second request.

At step 940, upon receiving the second request from the egress node PE4, the transit node P1 sends a first acknowledgement to the egress node PE4 to acknowledge the receipt of the second LSP deletion request. At step 945, upon receiving the first acknowledgement from the transit node P1, the egress node PE4 may flush the second LSP deletion request from the local memory.

At step 950, in response to the second LSP deletion request, the transit node P1 releases L1 recorded under LSP-ID and removes the FIB entry, (L1, L4). At step 955, the transit node P1 sends a third LSP deletion request to the ingress node PE1 (e.g., a next upstream node along the LSP) requesting deletion of the LSP. The third LSP deletion request includes L1, LSP-ID, and the remaining hop in the LSP (e.g., {PE1}). Similarly, the transit node P1 may store the third LSP deletion request in the local memory until the ingress node PE1 acknowledges the receipt of the third LSP deletion request.

At step 960, upon receiving the third LSP deletion request from the transit node P1, the ingress node PE1 sends a second acknowledgement to the transit node P1 to acknowledge the receipt of the third request. At step 965, upon receiving the second acknowledgement from the ingress node PE1, the transit node P1 may flush the third LSP deletion request from the local memory.

At step 970, in response to the third LSP deletion request, the ingress node PE1 deletes the FIB entry, (traffic, push L1) corresponding to the LSP-ID. At step 975, the ingress node PE1 looks up a route for sending a response to the ZR controller. The response includes the LSP-ID and a deletion status of the LSP. For example, the route indicates the second communication node is a next-hop node. At step 980, the ingress node PE1 sends the response to the second communication node. At step 985, the second communication node forwards the response to the ZR controller. At step 990, upon receiving the response, the ZR controller updates the P2P LSPDB according to the received response. For example, the ZR controller releases the LSP-ID back to the P2P LSPDB and deletes associated path information.

Although the method 900 is illustrated with a single transit node, the method 900 may be employed to delete LSPs with multiple transit nodes, which perform similar operations as the transit node P1. In addition, the method 900 may be employed to delete a P2MP LSP. To delete P2MP LSP, the ZR controller may send an LSP deletion request to each egress node (e.g., destination node) of the P2MP LSP. It should be noted that the first and the second acknowledgements at steps 940 and 960 and/or the flushing of the second and third LSP deletion requests at steps 945 and 965 may be optional in some embodiments. In addition, the first communication node and the second communication node may be the same node. Further, the first communication node may be the egress node or the ingress node. Similarly, the second communication node may be the egress node or the ingress node.

The methods 800 and 900 may be applied when the first communication node or the second communication node are connected to the ZR controller via one or more transit nodes. In one embodiment, each transit node along a shortest path between the ZR controller and first communication node functions as a relay node. For example, when a relay node receives a first LSP creation request from a previous-hop node along the shortest path, which may be the ZR controller or another node, the relay node generates a second LSP creation request according to the received first LSP creation requests (e.g., same content). The relay node sends an acknowledgement to the previous-hop node to acknowledge the reception of the first LSP creation request and sends the second LSP creation request to a next-hop node along the shortest path. In such an embodiment, each relay node flushes a previously sent LSP creation request after receiving a corresponding acknowledgement. Similarly, when the ZR controller receives an acknowledgement for a previously sent LSP creation request, the ZR controller flushes the LSP creation request. In some other embodiments, relay nodes and communication nodes do not flush LSP creation requests after receiving acknowledgements from next-hop nodes. In such embodiments, the ZR controller flushes a previously sent LSP creation request after receiving a corresponding LSP creation response. The relay nodes and the communication nodes flush LSP creation requests after previous-hop nodes flush the LSP creation requests. The relay nodes perform similar operations for LSP creation response, LSP deletion request, and LSP deletion response.

Figure 10:
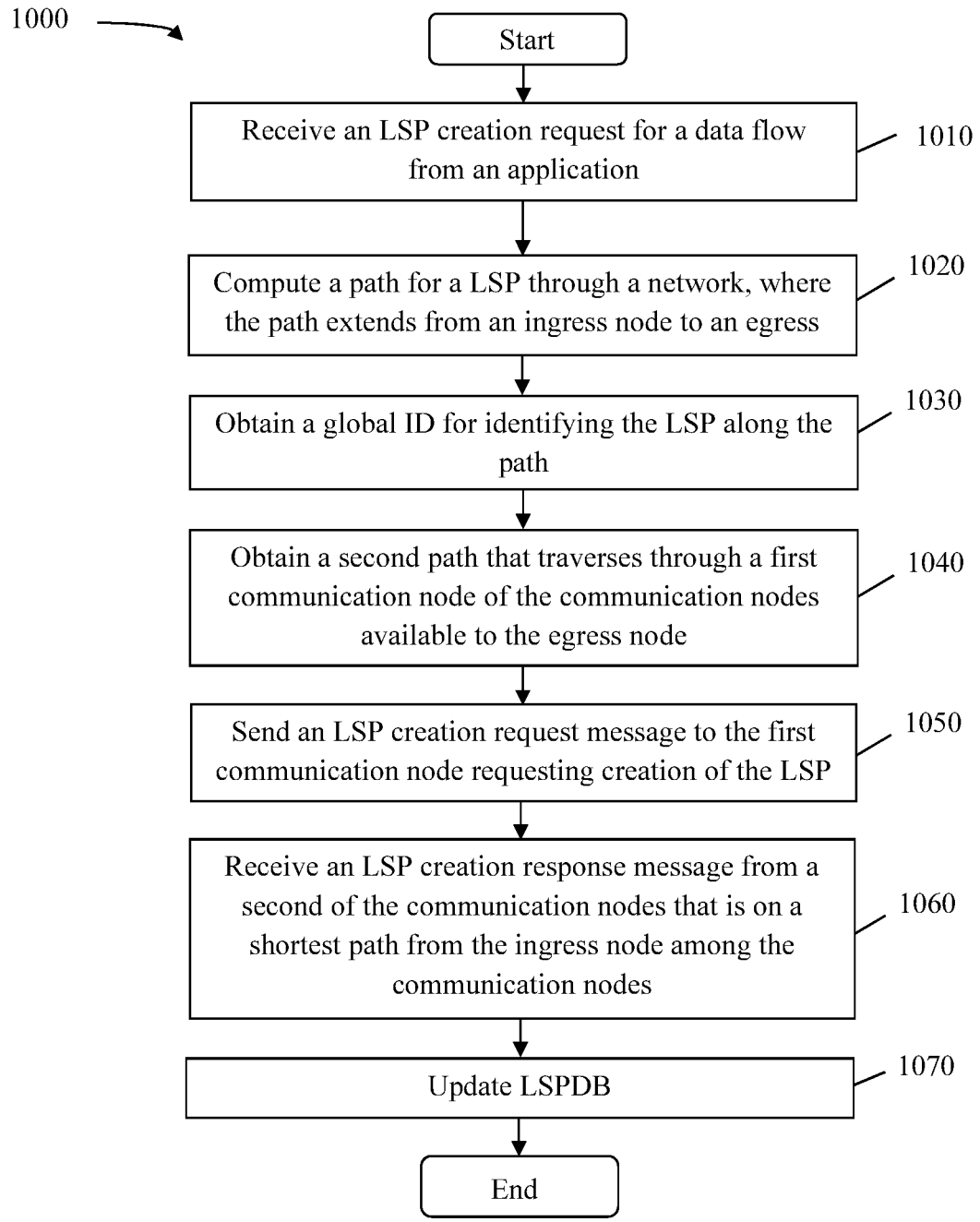
FIG. 10 is a flowchart of a method for creating an LSP according to an embodiment of the disclosure.

FIG. 10 is a flowchart of a method 1000 for creating an LSP such as the LSPs 251, 351, 451, and 551 according to an embodiment of the disclosure. The method 1000 is implemented by a network controller such as the ZR controllers 310, 410, 510, and 700 and the NE 600 in a network such as the systems 300, 400, and 500. The network comprises a plurality of edge nodes such as the edge nodes 121, 221, 321, 421, and 521 and a plurality of internal nodes such as the internal nodes 122, 222, 322, 422, and 522. The network controller is coupled to one or more communication nodes in the network via one or more communication channels such as the communication channels 140, 240, 340, 440, and 540. The communication nodes correspond to less than all the edge nodes in the network. The communication nodes may comprise an edge node and/or an internal node of the network. The method 1000 employs similar mechanisms as described in the methods 800 and 900. The method 1000 begins at step 1010 when an LSP creation request for a data flow is received from a user or an application that employs the network for data forwarding. The data flow may be identified by a traffic class, which may be identified by an FEC or an interface index.

At step 1020, a path through the network is computed. The path extends from an ingress node (e.g., PE1) of the edge nodes to an egress node (e.g., PE4) of the edge nodes. The path may traverse through one or more internal nodes (e.g., P1 and P2). For example, the network controller employs a CSPF engine such as the CSPF computational unit 711 to compute the path. At step 1030, a global ID is obtained for the LSP along the path. For example, the network controller employs an LSP manager such as the LSP manager 713 to allocate the global ID from an LSPDB such as the P2P LSPDB 714 and the P2MP LSPDB 715.

At step 1040, selected second path that traverses through a first communication node of the communication nodes is obtained. For example, the network controller comprises an RIB similar to the RIB 717 that identifies paths to reach every node in the network and the first communication node comprises a shortest path among the communication nodes from the network controller to the egress node. At step 1050, an LSP creation request message is sent to the first communication node. The LSP creation request message comprises the global ID, the traffic class that describes the data flow, the network controller address (e.g., an IP address), and path information indicating a node sequence (e.g., {PE4←P2←P1←PE1}) for the path from the ingress edge node to the egress edge node. In addition, the path information may include a bandwidth reserved for each of the links such as the link 131 along the path. For example, the network controller employs a protocol processing unit such as the protocol processing unit 716 to generate the LSP creation request message.

At step 1060, an LSP creation response message is received from a second of the communication nodes that is on a shortest path to the network controller from the ingress node among the communication nodes indicating a creation status of the LSP in response to the LSP creation request message sent at step 1050. At step 1070, the LSPDB is updated according to the LSP creation response message. For example, the LSPDB stores an entry for the global ID, which may include the global ID, path information (e.g., bandwidths and the node sequence), and a state of the LSP. It should be noted that the method 1000 is suitable for creating a P2P LSP or a P2MP LSP. When creating a P2MP LSP, the path computed at step 1020 is for a P2MP LSP and the steps of 1040-1060 are repeated by selecting a closest communication node to each egress node of the P2MP LSP and sending a corresponding LSP creation request message to each closest communication node. In addition, in some embodiments, the first communication node and the egress node correspond to the same node and/or the second communication node and the ingress node correspond to the same node.

Figure 11:
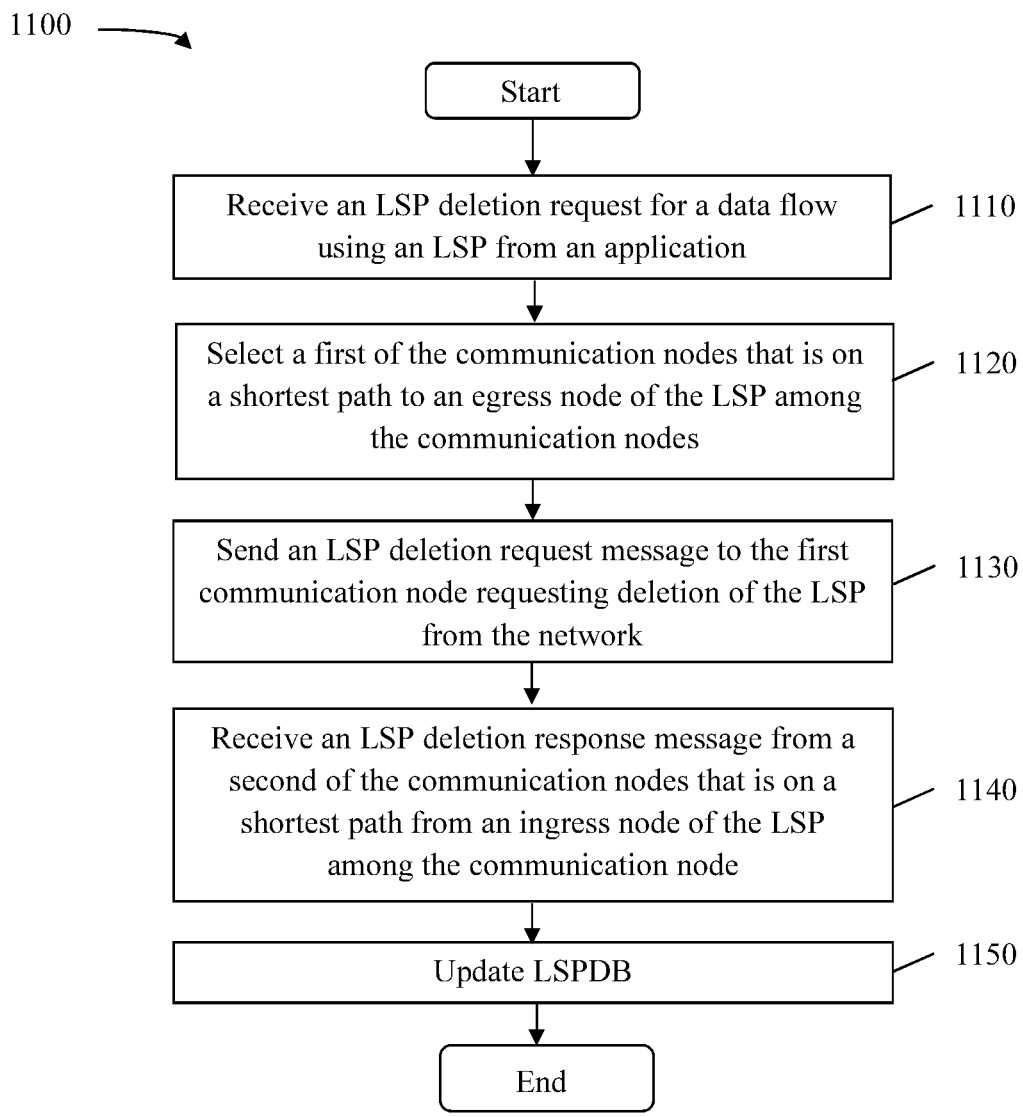
FIG. 11 is a flowchart of a method for deleting an LSP according to an embodiment of the disclosure.

FIG. 11 is a flowchart of a method 1100 for deleting an LSP such as the LSPs 251, 351, 451, and 551 according to an embodiment of the disclosure. The method 1100 is implemented by a network controller such as the ZR controllers 310, 410, 510, and 700 and the NE 600 in a network such as the systems 300, 400, and 500. The network comprises a plurality of edge nodes such as the edge nodes 121, 221, 321, 421, and 521 and a plurality of internal nodes such as the internal nodes 122, 222, 322, 422, and 522. The network controller is coupled to one or more communication nodes in the network via one or more communication channels such as the communication channels 140, 240, 340, 440, and 540. The communication nodes correspond to less than all the edge nodes in the network. The communication nodes may comprise an edge node and/or an internal node of the network. The method 1100 employs similar mechanisms as described in the methods 800 and 900. The method 1100 is implemented after an LSP is created for a data flow by employing similar mechanisms as described in the methods 800, 900, and 1000. For example, a global ID is allocated to the LSP, where the global ID and a list of nodes along the LSP are stored in an LSPDB such as the P2P LSPDB 714 and the P2MP LSPDB 715. At step 1110, an LSP deletion request for the data flow is received from a user or an application.

At step 1120, a first of the communication nodes that is on a shortest path from the network controller to an egress node of the LSP among the communication nodes is selected. At step 1130, an LSP deletion request message is sent to the first communication node. The LSP deletion request message comprises the global ID of the LSP, the list of nodes in the LSP, and the network controller address.

At step 1140, an LSP deletion response message is received from a second of the communication nodes that is on a shortest path from an ingress node of the LSP to the network controller among the communication nodes.

At step 1150, the LSPDB is updated according to the LSP deletion response message. For example, the global ID is released and returned to the LSPDB and information associated with the global ID is deleted from the LSPDB. It should be noted that the method 1100 is suitable for deleting a P2P LSP or a P2MP LSP. When deleting a P2MP LSP, the steps of 1120-1130 are repeated by selecting a closest communication node to each egress node of the P2MP LSP and sending a corresponding LSP deletion request message to each closest communication node. In addition, in some embodiments, the first communication node and the egress node correspond to the same node and/or the second communication node and the ingress node correspond to the same node.

Figure 12:
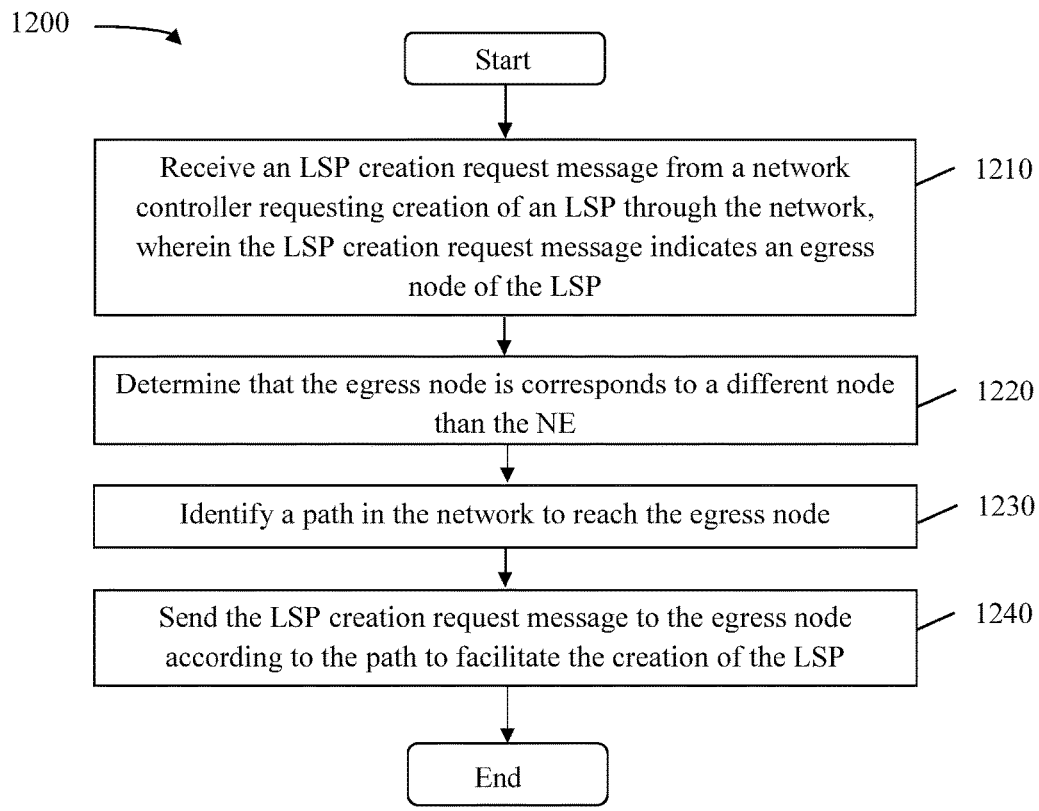
FIG. 12 is a flowchart of a method for facilitating LSP creation according to another embodiment of the disclosure.

FIG. 12 is a flowchart of a method 1200 for facilitating LSP creation according to an embodiment of the disclosure. The method 1200 is implemented by a NE such as the NE 600 operating as a communication node in direct association with a network controller such as the ZR controllers 310, 410, and 510 of a network such as the systems 300, 400, and 500. The network comprises a plurality of edge nodes such as the edge nodes 121, 221, 321, 421, and 521 and a plurality of internal nodes such as the internal nodes 122, 222, 322, 422, and 522. The communication node may correspond to an edge node or an internal node of the network. The communication node communicates with the network controller via a communication channel such as the communication channels 140, 240, 340, 440, and 540. The method 1200 employs similar mechanisms as described in the methods 800 and 900. The method 1200 begins at step 1210 when an LSP creation request message is received from the network controller requesting creation of an LSP such as the LSPs 251, 351, 451, and 551. The LSP creation request message indicates an egress node of the LSP. At step 1220, a determination is made that the egress node corresponds to a different node than the NE. At step 1230, a path in the network to reach the egress node is identified. At step 1240, the LSP creation request message is sent to the egress node according to the path to facilitate the creation of the LSP. It should be noted that the communication node may facilitate deletion of LSPs by employing similar mechanisms as the method 1200.

Figure 13:
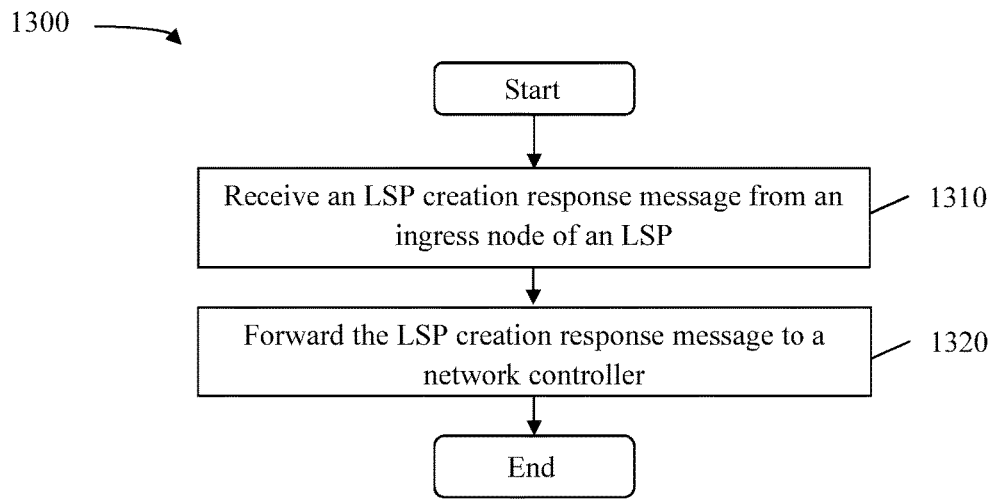
FIG. 13 is a flowchart of a method for facilitating LSP creation and deletion according to an embodiment of the disclosure.

FIG. 13 is a flowchart of a method 1300 for facilitating LSP creation and deletion according to an embodiment of the disclosure. The method 1300 is implemented by a NE such as the NE 600 operating as a communication node in direct association with a network controller such as the ZR controllers 310, 410, and 510 of a network such as the systems 300, 400, and 500. The network comprises a plurality of edge nodes such as the edge nodes 121, 221, 321, 421, and 521 and a plurality of internal nodes such as the internal nodes 122, 222, 322, 422, and 522. The communication node may correspond to an edge node or an internal node of the network. The communication node communicates with the network controller via a communication channel such as the communication channels 140, 240, 340, 440, and 540. The method 1300 employs similar mechanisms as described in the methods 800 and 900. The method 1300 begins at step 1310 when an LSP creation response message is received from an ingress node of an LSP such as the LSPs 251, 351, 451, and 551. At step 1320, the LSP creation response message is forwarded to the network controller via a corresponding communication channel.

Figure 14:
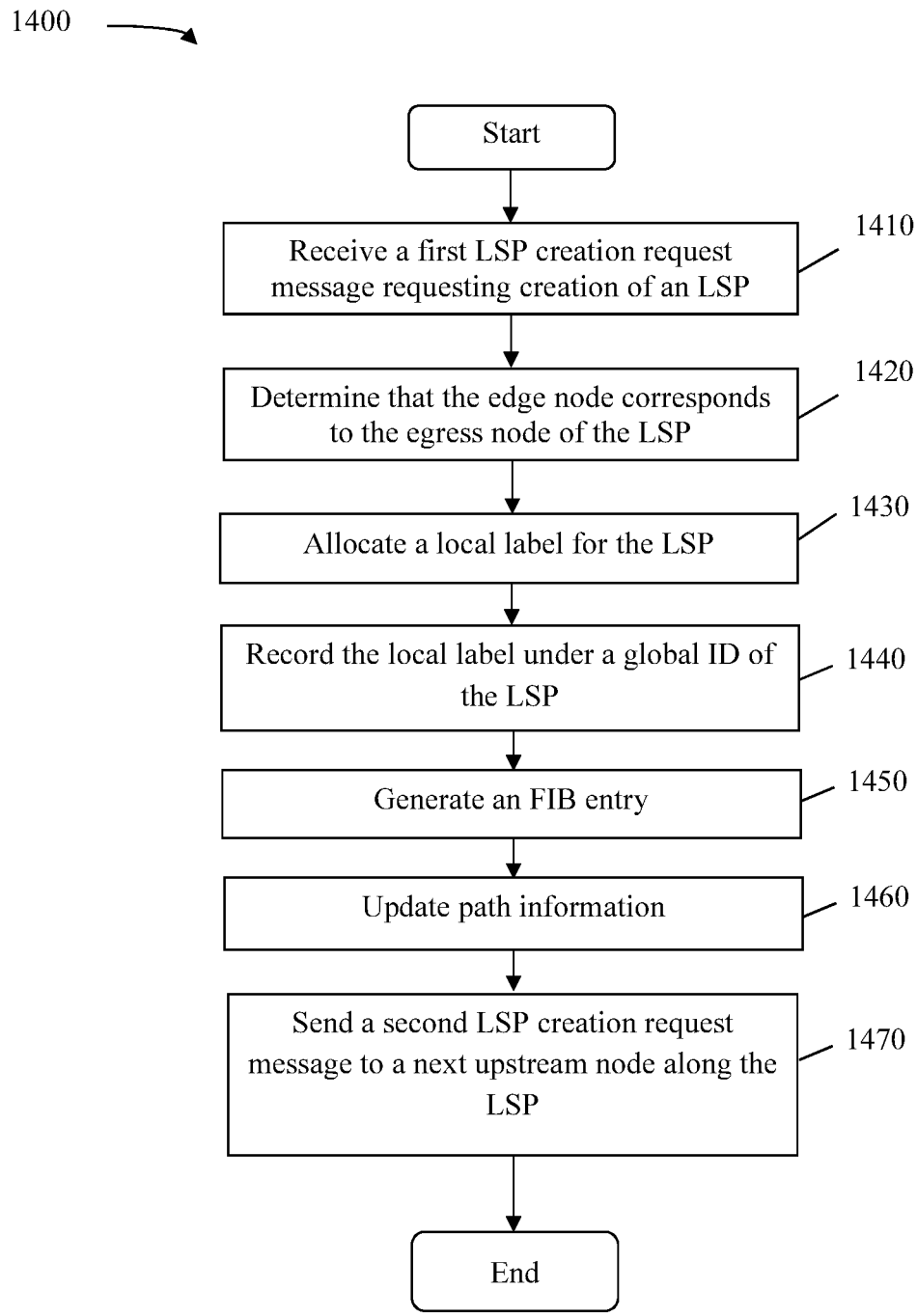
FIG. 14 is a flowchart of a method for creating an LSP according to another embodiment of the disclosure.

FIG. 14 is a flowchart of a method 1400 for creating an LSP such as the LSPs 251, 351, 451, and 551 according to another embodiment of the disclosure. The method 1400 is implemented by an edge node such as the edge nodes 321, 421, and 521 and the NE 600 of a network such as the systems 300, 400, and 500. The method 1400 employs similar mechanisms as described in the methods 800 and 900. The method 1400 begins at step 1410 when a first LSP creation request message requesting creation of an LSP is received. The first LSP creation request message comprises a global ID (e.g., LSP-ID) for the LSP, a traffic class that may be forwarded along the LSP, the network controller address (e.g., an IP address), and path information for the LSP. For example, the path is represented in the form of an ordered list {PE4←P2←P1←PE1}, where PE4 is an egress node of the LSP, PE1 is an ingress node of the LSP, and P1 and P2 are transit nodes along the LSP.

At step 1420, a determination is made that the edge node corresponds to the egress node of the LSP. It should be noted that when the egress node of the LSP corresponds to a different node than the edge node, the edge node employs the method 1200 to forward the first LSP creation request message to the egress node.

At step 1430, a local label (e.g., L4) is allocated for the LSP, for example, from a local pool of labels maintained by the edge node. At step 1440, the local label is recorded under the global ID. At step 1450, an FIB entry is generated for the LSP. The FIB entry comprises a match condition and an action. For example, the FIB entry is in the form of (L4, pop), which instructs the egress node to perform a label pop action (e.g., label removal) when receiving a packet with a label L4. At step 1460, the path information is updated, for example, by removing PE4 from the node list of the path (e.g., {P2←P1←PE1}). At step 1470, a second LSP creation request message is sent to a next upstream node (e.g., P2) along the LSP. The second LSP creation request message comprises the global ID, the local label, the traffic class, and the updated path information (e.g., {P2←P1←PE1}).

Figure 15:
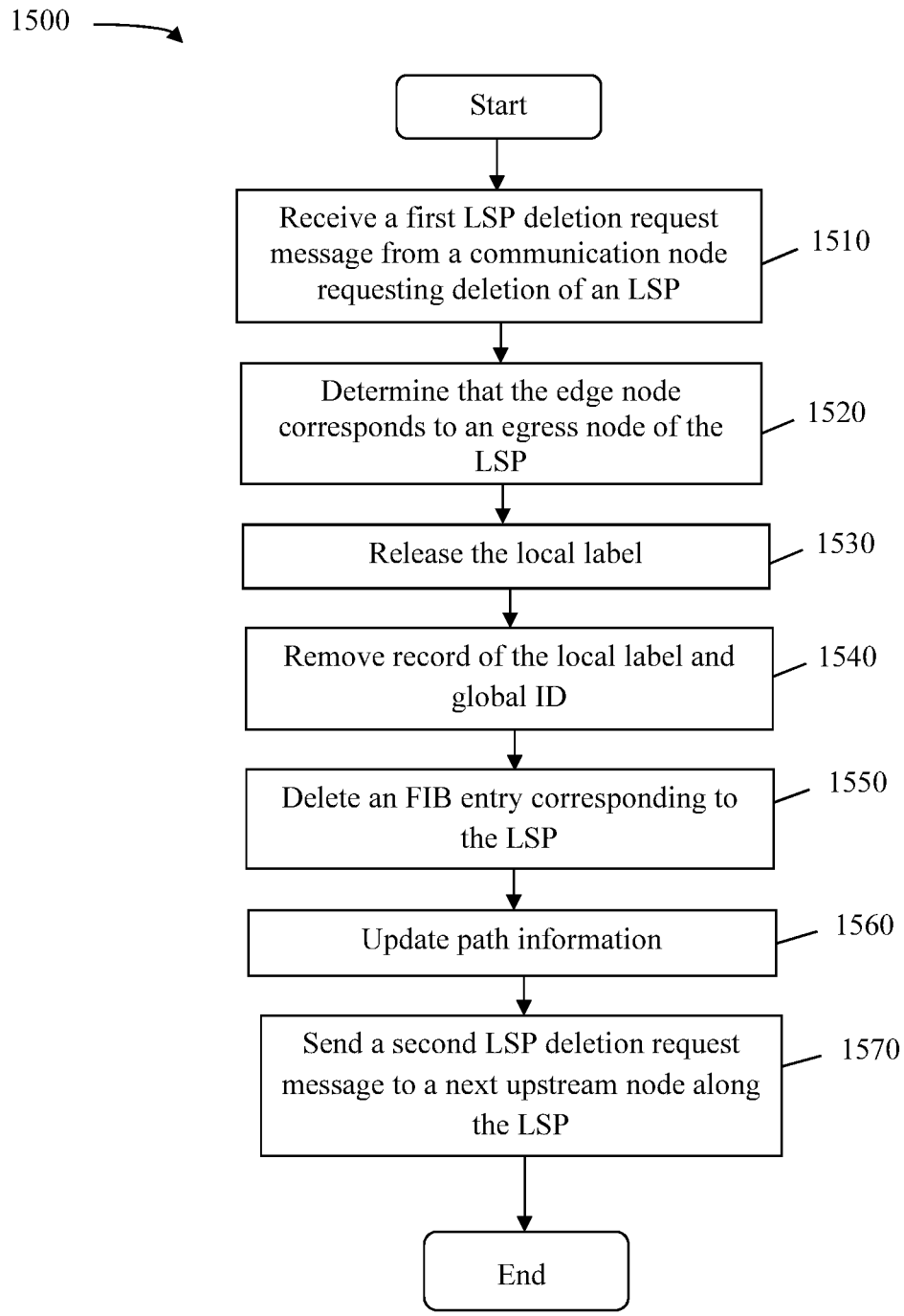
FIG. 15 is a flowchart of a method for deleting an LSP according to another embodiment of the disclosure.

FIG. 15 is a flowchart of a method 1500 for deleting an LSP such as the LSPs 251, 351, 451, and 551 according to another embodiment of the disclosure. The method 1500 is implemented by an edge node such as the edge nodes 321, 421, and 521 and the NE 600 of a network such as the systems 300, 400, and 500. The method 1500 employs similar mechanisms as described in the methods 800 and 900. The method 1500 is implemented after an LSP is created by employing the method 1400. For example, the LSP is identified by a global ID, a local label is allocated from a local pool to the LSP, and an FIB entry is created for the LSP. At step 1510, a first LSP deletion request message is received from the network controller. The first path deletion request message comprises a global ID (e.g., LSP-ID) of the LSP, a list of nodes in the LSP (e.g., {PE4←P2←P1←PE1}), and a network controller address.

At step 1520, a determination is made that the edge node corresponds to the egress node of the LSP. It should be noted that when the egress node of the LSP corresponds to a different node than the edge node, the edge node employs the method 1200 to forward the first LSP deletion request message to the egress node.

At step 1530, the local label for the LSP is released. For example, the edge node looks up the local label that is previously recorded under the global ID and returns the local label to the local pool. At step 1540, the record for the global ID and the local label is removed. At step 1550, the FIB entry corresponding to the LSP (e.g., associated with the local label) is deleted. At step 1560, the path information is updated (e.g., {P2←P1←PE1}). At step 1570, a second LSP deletion request message is sent to a next upstream node (e.g., P2) along the LSP. The second LSP deletion request message comprises the global ID, the local label, and the updated path information.

Figure 16:
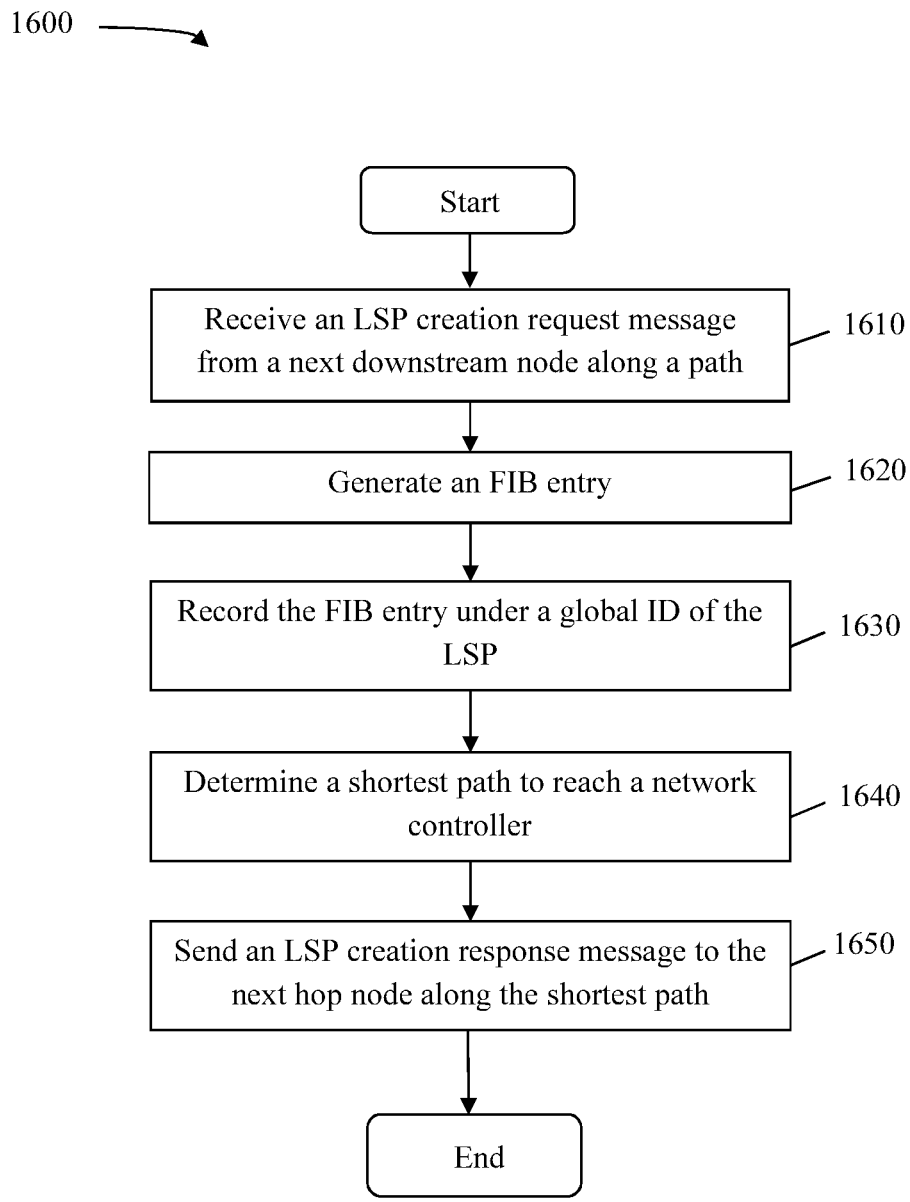
FIG. 16 is a flowchart of a method for creating an LSP according to another embodiment of the disclosure.

FIG. 16 is a flowchart of another embodiment of a method 1600 for creating an LSP such as the LSPs 251, 351, 451, and 551 according to another embodiment of the disclosure. The method 1600 is implemented by an edge node such as the edge nodes 321, 421, and 521 and the NE 600 of a network such as the systems 300, 400, and 500. The method 1600 employs similar mechanisms as described in the methods 800 and 900. The method 1600 begins at step 1610 when an LSP creation request message is received from a next downstream node along an LSP. For example, the creation of the LSP is initiated by a network controller such as the ZR controllers 310, 410, and 510 and the LSP traverses from a first edge node (e.g., PE1) to a second edge node (e.g., PE4) through two internal nodes (e.g., P1 followed by P2) of the network. Thus, the next downstream node may correspond to P1. The first LSP creation request message comprises a global ID (e.g., LSP-ID) for the LSP, a local label (e.g., L1), a traffic class (e.g., FEC or an interface index) that may be forwarded along the LSP, the network controller address (e.g., an IP address), and path information (e.g., {PE1}). At step 1620, an FIB entry is generated according to the traffic class and the local label. The FIB entry comprises a match condition and an action. For example, the FIB entry is in the form of FEC/interface index, push L1, which instructs the ingress node to perform a label push action (e.g., add label L1) when receiving a packet corresponding to the traffic class indicated by FEC or the interface index. At step 1630, the FIB entry is recorded under the global ID of the LSP.

At step 1640, a shortest path or a route to reach a network controller is determined using a RIB. At step 1650, an LSP creation response message is sent to the next-hop node along the shortest path node, where the LSP creation response message is destined to the network controller. When a network node receives the LSP creation response message, the network node determines a route or shortest path to the network controller using a RIB and sends the message to the next-hop node along the path.

Figure 17:
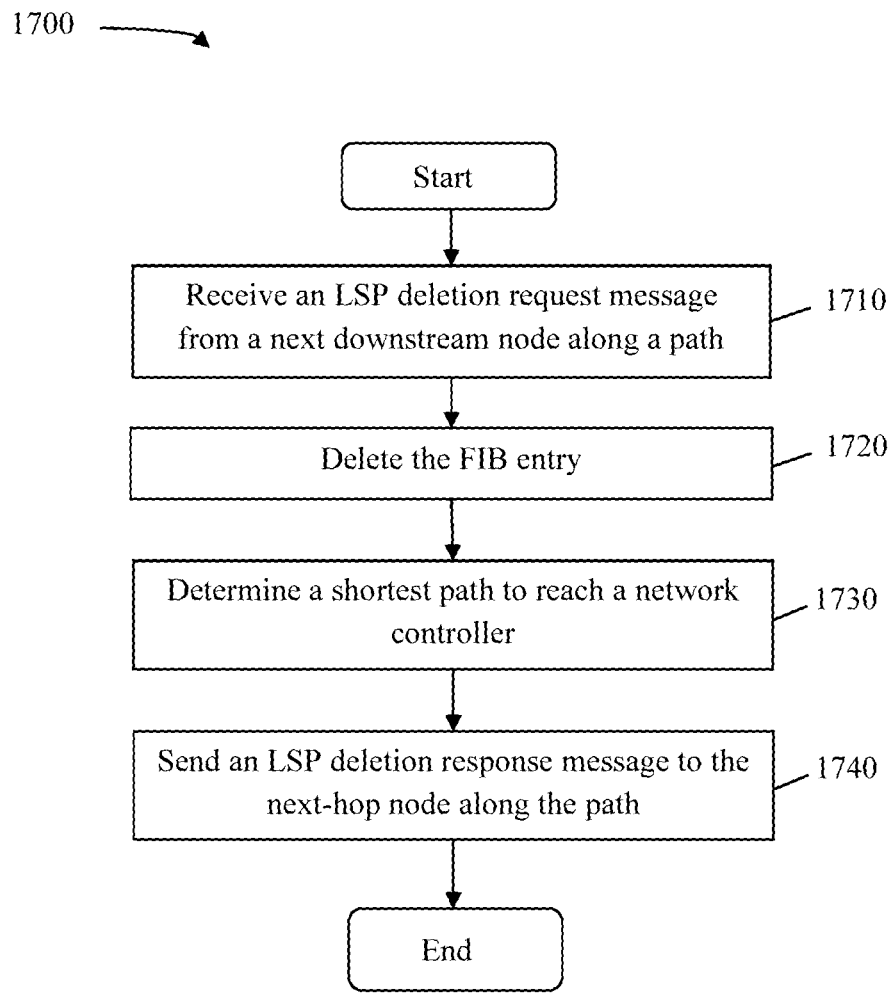
FIG. 17 is a flowchart of a method for deleting an LSP according to another embodiment of the disclosure.

FIG. 17 is a flowchart of another embodiment of a method 1700 for deleting an LSP such as the LSPs 251, 351, 451, and 551 according to another embodiment of the disclosure. The method 1700 is implemented by an edge node such as the edge nodes 321, 421, and 521 and the NE 600 of a network such as the systems 300, 400, and 500. The method 1700 employs similar mechanisms as described in the methods 800 and 900. The method 1700 is implemented after an LSP (e.g., {PE4←P2←P1←PE1}) is created by employing the method 1600. For example, the LSP is identified by a global ID and an FIB entry is created for the LSP. At step 1710, an LSP deletion request message is received from a next downstream node along the LSP. The LSP deletion request message may comprise the global ID (e.g., LSP-ID) of the LSP, path information (e.g., {PE1}), and the network controller address. At step 1720, an FIB entry corresponding to the LSP is deleted. For example, the FIB entry may be found by looking up a record that stores the FIB entry under the global ID.

At step 1730, a shortest path or a route to reach a network controller is determined using a RIB. At step 1740, an LSP deletion response message is sent to the next-hop node along the shortest path, where the LSP deletion response message is destined to the network controller. When a network node receives the LSP deletion response message, the network node determines a route or shortest path to the network controller using a RIB and sends the message to the next-hop node along the path.

In contrast to an SR scheme, the disclosed ZR-X scheme simplifies the controller-node interactions by enabling a ZR controller such as the controllers 310, 410, and 510 to communicate with a configurable number of edge nodes such as the edge nodes 321, 421, and 521 and/or internal nodes such as the internal nodes 322, 422, and 522 of a network such as the networks 330, 430, and 530, but not with all nodes as in the system 100 and not with all edge nodes as in the system 200. In the ZR-X scheme, a single local label may be attached to a packet to indicate a next hop instead of a stack of labels. Thus, a network or a portion of a network may be easily migrated to employ the ZR-X scheme without any hardware upgrades, service interruptions, and/or significant network architecture changes. Thus, a network that employs the ZR-X scheme may provide better scalability than a network that employs SR and the design of the ZR-X controller is simpler than an SR controller. The following table lists comparisons between SR and ZR-X:

TABLE 1

Comparisons between SR and ZR-X

|  | SR | ZR-X |
|---|---|---|
| Source Routing | Yes | No |
| Some Hardware Devices Upgrade | Yes | No |
| Extra Data Packet Overhead | Large | Minimal |
| Multicast Support | No | Yes |
| Network Scalability | Limited | High Scalability |
| Controller connects to every edge node of a network | Yes | No |
| Migration | Difficult | Simple |
| Service Interruption During Migration | Yes | No |
| Controller Design | Complex | Simple |
| Change to Existing Network Architecture | Significant | Minimal |

In contrast to an MPLS network that employs a path computation element (PCE) controller, the disclosed ZR-X scheme simplifies the routing process by allowing the edge nodes 321, 421, and 521 and the internal nodes 322, 422, and 522 in a network such as the networks 330, 430, and 530 to manage and allocate local labels along an LSP tunnel such as the LSPs 251, 351, 451, and 551. In addition, a ZR-X controller such as the ZR controllers 310, 410, and 510 establishes communication channels such as the communication channels 140, 240, 340, 440, and 540 with any node in a network, but not all nodes of a network. Thus, the ZR controller does not write and/or delete cross connect on every node along the LSP tunnel. Thus, a network that employs ZR-X may provide better scalability than a network that employs a PCE controller and the design of the ZR-X controller is simpler than a PCE controller. The following lists comparisons between a network that employs a PCE and a network that employs ZR-X:

TABLE 2

Comparisons between PCE and ZR-X

| | PCE | ZR-X |
|---|---|---|
| Controller manages label resource including allocation of labels along a tunnel | Yes | No |
| Controller connects every node in a network | Yes | Only any X number of nodes in a network |
| Controller writes/deletes cross connect on every node along a tunnel | Yes | No |
| Network Scalability | Limited | High scalability |
| Controller Complexity | Complex | Simple |

Figure 18:
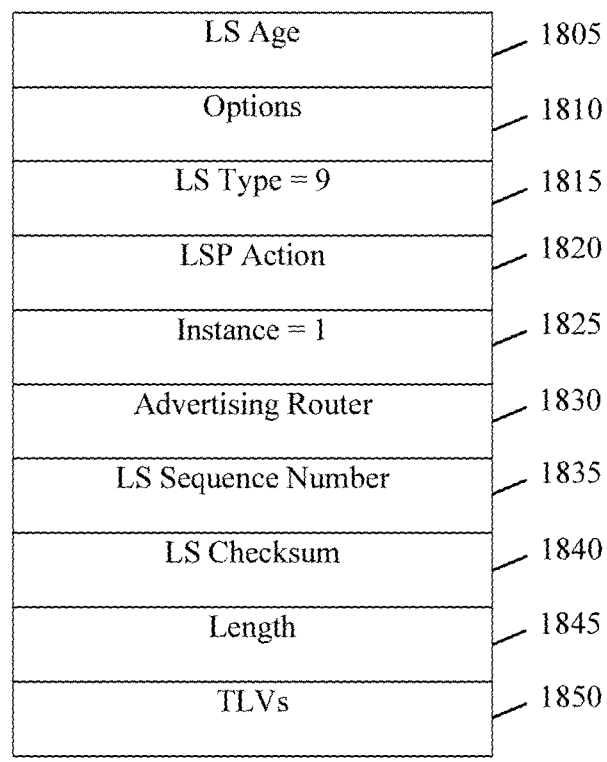
FIG. 18 is a schematic diagram illustrating an embodiment of an open shortest path first (OSPF) opaque link-state advertisement (LSA) packet.

FIGS. 18-35 illustrate various embodiments of extensions to OSPF LSA messages described in Internet Engineering Task Force (IETF) documents Request For Comments (RFC) 5250. FIG. 18 is a schematic diagram of an embodiment of an OSPF opaque LSA 1800. The LSA 1800 is employed by a ZR controller such as the ZR controllers 310, 410, and 510, edge nodes such as the edge nodes 321, 421, and 521, and/or internal nodes such as the internal nodes 322, 422, and 522 of a network such as the networks 330, 430, and 530 to create and delete LSPs such as the LSPs 251, 351, 451, and 551 in the network. For example, the LSA 1800 may be configured as part of an LSP creation request message, an LSP creation response message, an LSP deletion request message, or an LSP deletion response message, as described more fully below. The LSA 1800 comprises a link state (LS) age field 1805, an options field 1810, an LS type field 1815, an LSP action field 1820, an instance field 1825, an advertising router field 1830, a LS sequence number field 1835, a LS checksum field 1840, a length field 1845, and TLVs field 1850.

The LS age field 1805 is about two octets long and indicates the time in seconds since the LSA 1800 was originated. The options field 1810 is about one octet long and indicates the optional capabilities supported by a routing domain. The LS type field 1815 is about one octet long and may indicate the format and function of LSA 1800. For example, the LSA type field 1815 is to a value of nine to indicate that the LS 1800 is a link-local opaque LSA. The LSP action field 1820 is about one octet long and indicates whether an LSP action is an LSP creation or an LSP deletion. The instance field 1825 is about three octets long and indicates an instance number of the LSA 1800. For example, the instance field 1825 is set to a value of one to indicate a first instance of the LSA 1800. The advertising router field 1830 is about four octets long and indicates a router ID of the LSA's 1800 originator. The LS sequence number field 1835 is about four octets long and may be incremented by a router when a new LSA is being generated and may be employed to detect LSA duplications or old LSAs. The LS checksum field 1840 is about two octets long and indicates the checksum for the complete contents of LSA 1800. The length field 1845 is about two octets long and indicates the length of the LSA in bytes. The TLVs field 1850 may be variable in length. A TLV encoded message may include a type field that may indicate the message type, followed by a length field that may indicate the size of the message value, and a variable-sized series of octets that carry the data for the message. The TLVs field 1850 may comprise LSP path information, as discussed more fully below.

Figure 19:
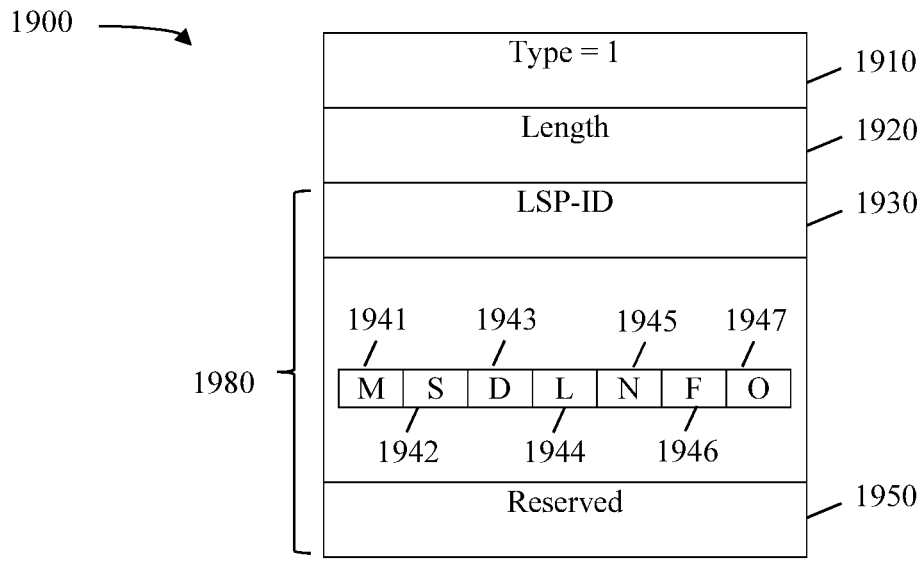
FIG. 19 is a schematic diagram illustrating an embodiment of an LSP-identifier (LSP-ID) type-length-value (TLV).

FIG. 19 is a schematic diagram of an embodiment of an LSP-ID TLV 1900. The LSP-ID TLV 1900 is employed by a ZR controller such as the ZR controllers 310, 410, and 510, edge nodes such as the edge nodes 321, 421, and 521, and/or internal nodes such as the internal nodes 322, 422, and 522 of a network such as the networks 330, 430, and 530 to create and delete LSPs such as the LSPs 251, 351, 451, and 551 in the network. The LSP-ID TLV 1900 may be included in the TLVs 1850 of the LSA 1800. The LSP-ID TLV 1900 comprises a type field 1910, a length field 1920, and a value field 1980. The value field 1980 comprises an LSP-ID field 1930, an M flag 1941, an S flag 1942, a D flag 1943, an L flag 1944, an N flag 1945, an F flag 1946, an O flag 1947, and a reserved field 1950.

The type field 1910 is about two octets long and may be set to a value of one to indicate that the LSP-ID TLV 1900 is an LSP-ID TLV. The length field 1920 is about two octets long and indicates the length of the value field 1980. The LSP-ID field 1930 is about four octets long and indicates an LSP-ID identifying an LSP (e.g., a global ID of the LSP 351). The M flag 1941 is about one bit long and is set to a value of one to indicate that the LSP-ID identifies a P2MP LSP. The S flag 1942 is about one bit long and set to a value of one to indicate that the LSP identified by the LSP-ID is set up. The D flag 1943 is about one bit long and set to a value of one to indicate that the LSP identified by the LSP-ID is deleted. The L flag 1944 is about one bit long and set to a value of one to indicate that link protection is implemented for the LSP identified by the LSP-ID. The N flag 1945 is about one bit long and set to a value of one to indicate that node protection is implemented for LSP identified by the LSP-ID. The F flag 1946 is about one bit long and set to a value of one to indicate that facility protection is implemented for the LSP identified by the LSP-ID. The O flag 1947 is about one bit long and set to a value of one to indicate that a one-to-one protection is available for the LSP identified by the LSP-ID. The reserved field 1950 is about 25 bits long and is reserved for future use.

Figure 20:
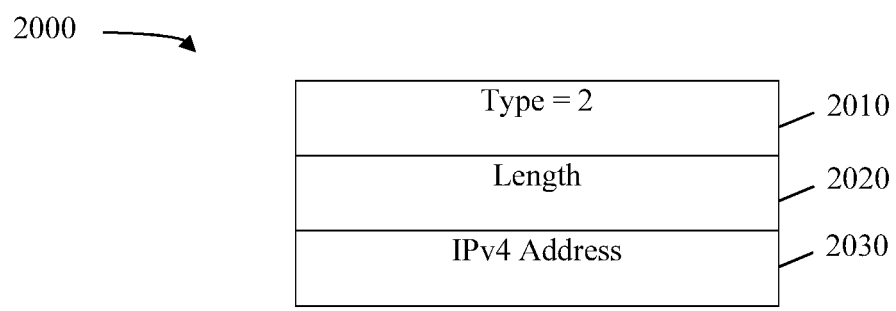
FIG. 20 is a schematic diagram of an embodiment of an Internet protocol version 4 (IPv4) destination address TLV.

FIG. 20 is a schematic diagram of an embodiment of an IPv4 destination address TLV 2000. The IPv4 destination address TLV 2000 is employed by a ZR controller such as the ZR controllers 310, 410, and 510, edge nodes such as the edge nodes 321, 421, and 521, and/or internal nodes such as the internal nodes 322, 422, and 522 of a network such as the networks 330, 430, and 530 to create and delete LSPs such as the LSPs 251, 351, 451, and 551 in the network. The IPv4 destination address TLV 2000 may be included in the TLVs 1850 of the LSA 1800. The IPv4 destination address TLV 2000 comprises a type field 2010, a length field 2020, and an IPv4 address field 2030. The type field 2010 is about two octets long and is set to a value of two to indicate that the IPv4 destination address TLV 2000 is an IPv4 destination address TLV. The length field 2020 is about two octets long and indicates a length of the IPv4 address field 2030. The IPv4 address field 2030 is about four octets long and indicates an IPv4 address of a destination of an LSP. For example, the LSA 1800 may include the IPv4 destination address TLV 2000 to indicate the destination of the LSP such as the LSP 351.

Figure 21:
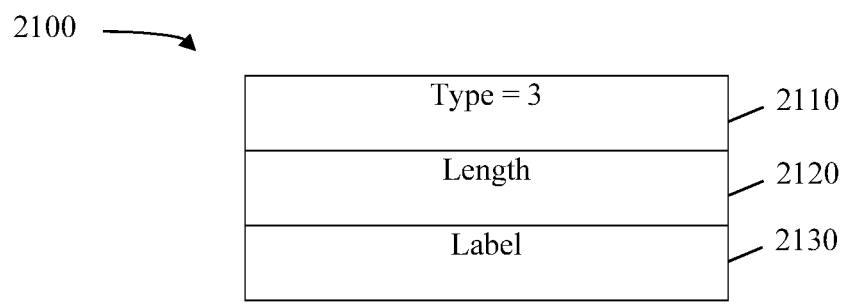
FIG. 21 is a schematic diagram of an embodiment of a label TLV.

FIG. 21 is a schematic diagram of an embodiment of a label TLV 2100. The label TLV 2100 is employed by edge nodes such as the edge nodes 321, 421, and 521, and/or internal nodes such as the internal nodes 322, 422, and 522 of a network such as the networks 330, 430, and 530 to create and delete LSPs such as the LSPs 251, 351, 451, and 551 in the network. The label TLV 2100 may be included in the TLVs 1850 of the LSA 1800. The label TLV 2100 comprises a type field 2110, a length field 2120, and a label field 2130. The type field 2110 is about two octets long and is set to a value of three to indicate that the label TLV 2100 is a label TLV. The length field 2120 is about two octets long and indicates a length of the label field 2130. The label field 2130 is about four octets long and indicates a local label for an LSP, such as the LSP 351. For example, the local label is locally significant between two consecutive nodes along the LSP.

Figure 22:
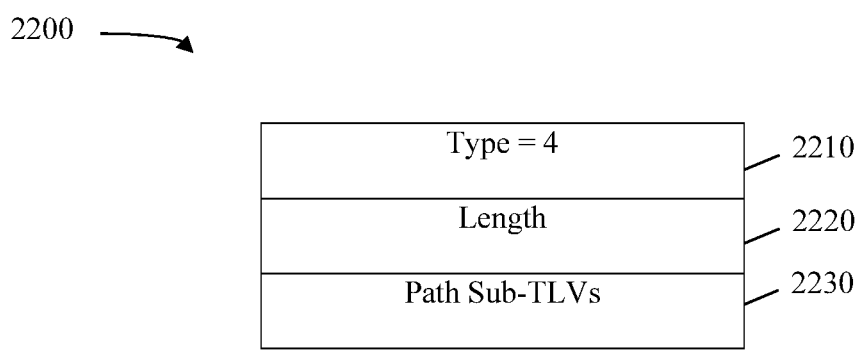
FIG. 22 is a schematic diagram of an embodiment of a path TLV.

FIG. 22 is a schematic diagram of an embodiment of a path TLV 2200. The path TLV 2200 is employed by a ZR controller such as the ZR controllers 310, 410, and 510, edge nodes such as the edge nodes 321, 421, and 521, and/or internal nodes such as the internal nodes 322, 422, and 522 of a network such as the networks 330, 430, and 530 to create and delete LSPs such as the LSPs 251, 351, 451, and 551 in the network. The path TLV 2200 may be included in the TLVs 1850 of the LSA 1800. The path TLV 2200 comprises a type field 2210, a length field 2220, and one or more path sub-TLVs 2230. The type field 2210 is about two octets long and is set to a value of four to indicate that the path TLV 2200 is a path TLV. The length field 2220 is about two octets long and indicates a length of the path sub-TLVs 2230. The path sub-TLVs 2230 may be variable in length and may comprise path information, such as a node list of paths, as discussed more fully below.

Figure 23:
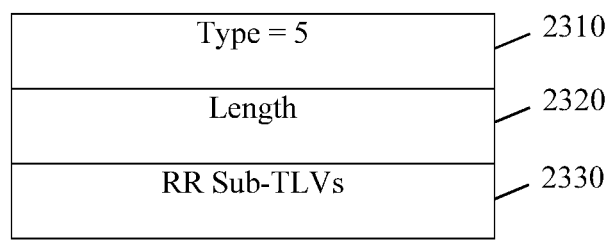
FIG. 23 is a schematic diagram of an embodiment of a record-route (RR) TLV.

FIG. 23 is a schematic diagram of an embodiment of an RR TLV 2300. The RR TLV 2300 is employed by a ZR controller such as the ZR controllers 310, 410, and 510, edge nodes such as the edge nodes 321, 421, and 521, and/or internal nodes such as the internal nodes 322, 422, and 522 of a network such as the networks 330, 430, and 530 to create and delete LSPs such as the LSPs 251, 351, 451, and 551 in the network. The RR TLV 2300 may be included in the TLVs 1850 of the LSA 1800. The RR TLV 2300 comprises a type field 2310, a length field 2320, and one or more RR sub-TLVs 2330. The type field 2310 is about two octets long and is set to a value of five to indicate that the RR TLV 2300 is a RR TLV. The length field 2320 is about two octets long and indicates a length of the RR sub-TLVs 2330. The RR sub-TLVs 2330 may be variable in length and may comprise a record of all the hops that the RR TLV 2300 has been routed through, as discussed more fully below.

Figure 24:
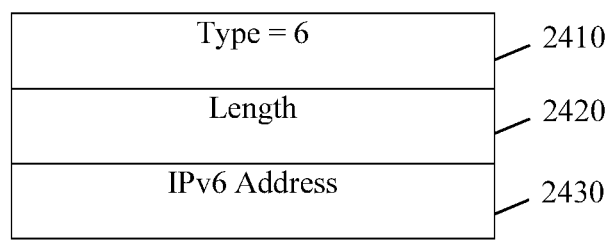
FIG. 24 is a schematic diagram of an embodiment of an Internet protocol version 6 (IPv6) destination address TLV.

FIG. 24 is a schematic diagram of an embodiment of an IPv6 destination address TLV 2400. The IPv6 destination address TLV 2400 is employed by a ZR controller such as the ZR controllers 310, 410, and 510, edge nodes such as the edge nodes 321, 421, and 521, and/or internal nodes such as the internal nodes 322, 422, and 522 of a network such as the networks 330, 430, and 530 to create and delete LSPs such as the LSPs 251, 351, 451, and 551 in the network. The IPv6 destination address TLV 2400 may be included in the TLVs 1850 of the LSA 1800. The IPv6 destination address TLV 2400 comprises a type field 2410, a length field 2420, and an IPv6 address field 2430. The type field 2410 is about two octets long and is set to a value of six to indicate that the IPv6 destination address TLV 2400 is an IPv6 destination address TLV. The length field 2420 is about two octets long and indicates a length of the IPv6 address field 2430. The IPv6 address field 2430 is about sixteen octets long and indicates an IPv6 address of a destination of an LSP. For example, the LSA 1800 may include the IPv6 destination address TLV 2400 to indicate the destination of the LSP 351.

Figure 25:
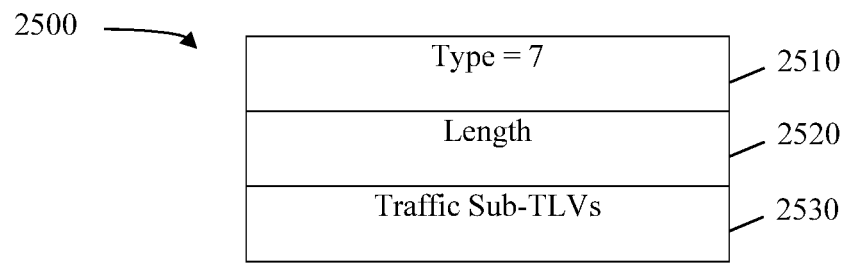
FIG. 25 is a schematic diagram of an embodiment of a traffic TLV.

FIG. 25 is a schematic diagram of an embodiment of a traffic TLV 2500. The traffic TLV 2500 is employed by a ZR controller such as the ZR controllers 310, 410, and 510, edge nodes such as the edge nodes 321, 421, and 521, and/or internal nodes such as the internal nodes 322, 422, and 522 of a network such as the networks 330, 430, and 530 to create and delete LSPs such as the LSPs 251, 351, 451, and 551 in the network. The traffic TLV 2500 may be included in the TLVs 1850 of the LSA 1800. The traffic TLV 2500 comprises a type field 2510, a length field 2520, and a traffic sub-TLVs 2530. The type field 2510 is about two octets long and is set to a value of seven to indicate that the traffic TLV 2500 is a traffic TLV. The length field 2520 is about two octets long and indicates a length of the traffic sub-TLVs 2530. The traffic sub-TLVs 2530 may be variable in length and comprise traffic class information, as discussed more fully below.

Figure 26:
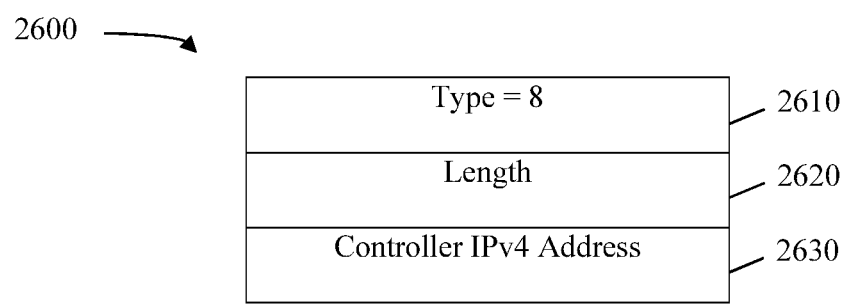
FIG. 26 is a schematic diagram of an embodiment of an IPv4 controller TLV.

FIG. 26 is a schematic diagram of an embodiment of an IPv4 controller TLV 2600. The IPv4 controller TLV 2600 is employed by a ZR controller such as the ZR controllers 310, 410, and 510, edge nodes such as the edge nodes 321, 421, and 521, and/or internal nodes such as the internal nodes 322, 422, and 522 of a network such as the networks 330, 430, and 530 to create and delete LSPs such as the LSPs 251, 351, 451, and 551 in the network. The IPv4 controller TLV 2600 may be included in the TLVs 1850 of the LSA 1800. The IPv4 controller TLV 2600 comprises a type field 2610, a length field 2620, and a controller IPv4 address field 2630. The type field 2610 is about two octets long and is set to a value of eight to indicate that the IPv4 controller TLV 2600 is an IPv4 controller TLV. The length field 2620 is about two octets long and indicates a length of the controller IPv4 address field 2630. The controller IPv4 address field 2630 is about four octets long and indicates an IPv4 address of the ZR controller.

Figure 27:
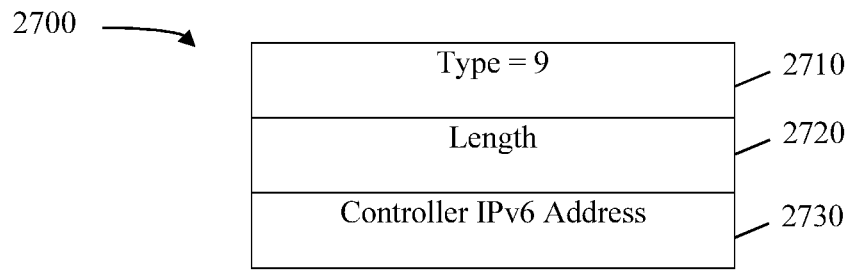
FIG. 27 is a schematic diagram of an embodiment of an IPv6 controller TLV.

FIG. 27 is a schematic diagram of an embodiment of an IPv6 controller TLV 2700. The IPv6 controller TLV 2700 is employed by a ZR controller such as the ZR controllers 310, 410, and 510, edge nodes such as the edge nodes 321, 421, and 521, and/or internal nodes such as the internal nodes 322, 422, and 522 of a network such as the networks 330, 430, and 530 to create and delete LSPs such as the LSPs 251, 351, 451, and 551 in the network. The IPv6 controller TLV 2700 may be included in the TLVs 1850 of the LSA 1800. The IPv6 controller TLV 2700 comprises a type field 2710, a length field 2720, and a controller IPv6 address field 2730. The type field 2710 is about two octets long and is set to a value of nine to indicate that the IPv6 controller TLV 2700 is an IPv6 controller TLV. The length field 2720 is about two octets long and indicates a length of the controller IPv6 address field 2730. The controller IPv6 address field 2730 is about sixteen octets long and indicates an IPv6 address of the ZR controller.

Figure 28:
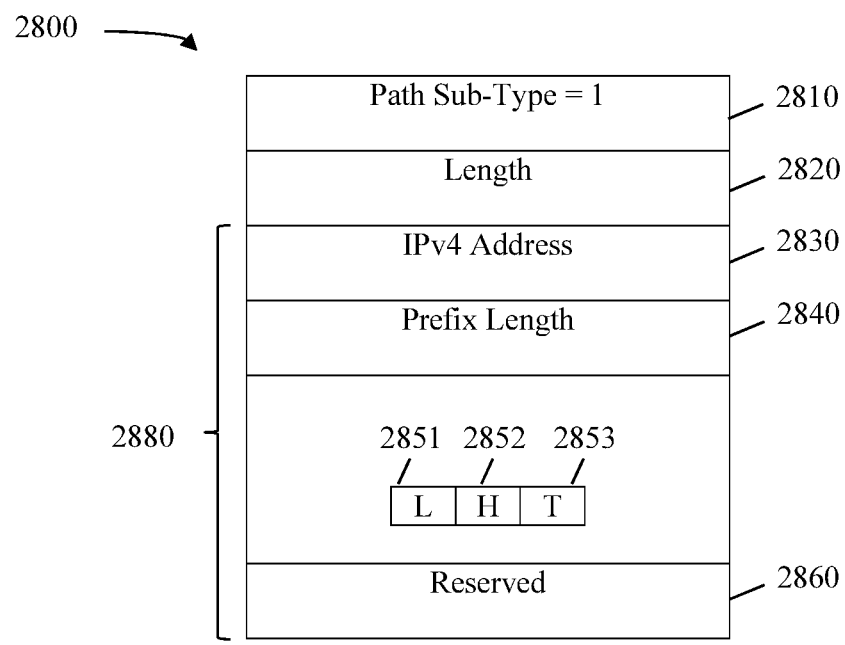
FIG. 28 is a schematic diagram of an embodiment of an IPv4 address path sub-TLV.

FIG. 28 is a schematic diagram of an embodiment of an IPv4 address path sub-TLV 2800. The IPv4 address path sub-TLV 2800 is employed by a ZR controller such as the ZR controllers 310, 410, and 510, edge nodes such as the edge nodes 321, 421, and 521, and/or internal nodes such as the internal nodes 322, 422, and 522 of a network such as the networks 330, 430, and 530 to create and delete LSPs such as the LSPs 251, 351, 451, and 551 in the network. The IPv4 address path sub-TLV 2800 may be included in the path sub-TLVs 2230 of the path TLV 2200. The IPv4 address path sub-TLV 2800 comprises a path sub-type field 2810, a length field 2820, and a value field 2880. The value field 2880 comprises an IPv4 address field 2830, a prefix length field 2840, an L flag 2851, an H flag 2852, a T flag 2853, and a reserved field 2860.

The path sub-type field 2810 is about two octets long and may be set to a value of one to indicate that the IPv4 address path sub-TLV 2800 is an IPv4 address path sub-TLV. The length field 2820 is about two octets long and indicates the length of the value field 2880. The IPv4 address field 2830 is about four octets long and indicates an IPv4 address, which may be the IPv4 address of an edge node or an internal node or an interface or a link. The prefix length field 2840 is about one octet long and indicates a prefix length (e.g., for a subnet). The L flag 2851 is about one bit long and is set to a value of one to indicate that the node identified by the IPv4 address is in a loose hop (e.g., transit nodes of an LSP). The H flag 2852 is about one bit long and set to a value of one to indicate that the node identified by the IPv4 address is a head of an LSP. The T flag 2853 is about one bit long and set to a value of one to indicate that the node identified by the IPv4 address is a tail of an LSP. The reserved field 2860 is about 26 bits long and is reserved for future use.

Figure 29:
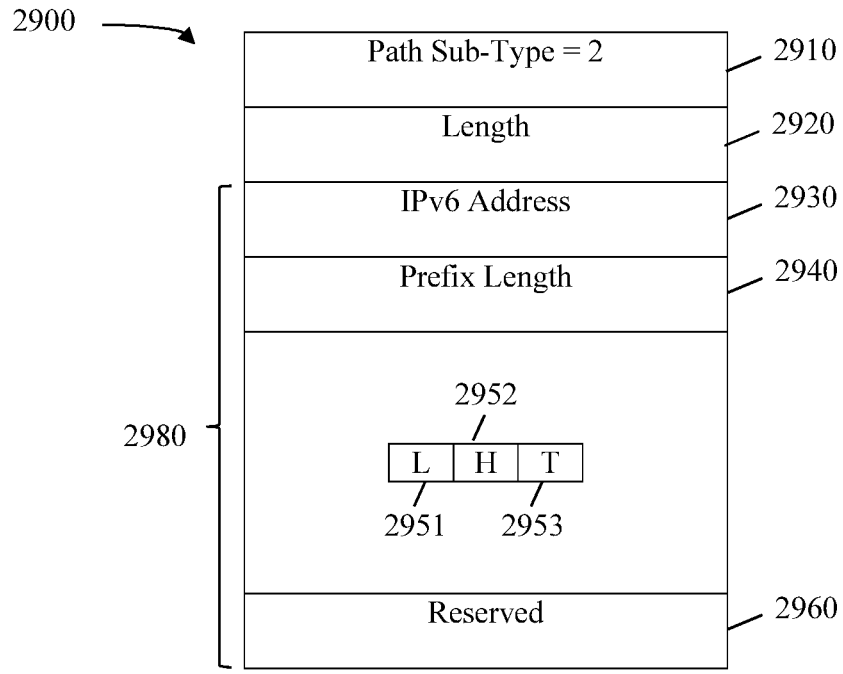
FIG. 29 is a schematic diagram of an embodiment of an IPv6 address path sub-TLV.

FIG. 29 is a schematic diagram of an embodiment of an IPv6 address path sub-TLV 2900. The IPv6 address path sub-TLV 2900 is employed by a ZR controller such as the ZR controllers 310, 410, and 510, edge nodes such as the edge nodes 321, 421, and 521, and/or internal nodes such as the internal nodes 322, 422, and 522 of a network such as the networks 330, 430, and 530 to create and delete LSPs such as the LSPs 251, 351, 451, and 551 in the network. The IPv6 address path sub-TLV 2900 may be included in the path sub-TLVs 2230 of the path TLV 2200. The IPv6 address path sub-TLV 2900 comprises a path sub-type field 2910, a length field 2920, and a value field 2980. The value field 2980 comprises an IPv6 address field 2930, a prefix length field 2940, an L flag 2951, an H flag 2952, a T flag 2953, and a reserved field 2960.

The path sub-type field 2910 is about two octets long and may be set to a value of two to indicate that the IPv6 address path sub-TLV 2900 is an IPv6 address path sub-TLV. The length field 2920 is about two octets long and indicates the length of the value field 2980. The IPv6 address field 2930 is about sixteen octets long and indicates an IPv6 address, which may be the IPv6 address of an edge node or an internal node or an interface or a link. The prefix length field 2940 is about one octet long and indicates a prefix length (e.g., for a subnet). The L flag 2951, the H flag 2952, and the T flag 2953 are similar to the L flag 2851, the H flag 2852, and the T flag 2853, respectively. The reserved field 2960 is about 26 bits long and is reserved for future use.

Figure 30:
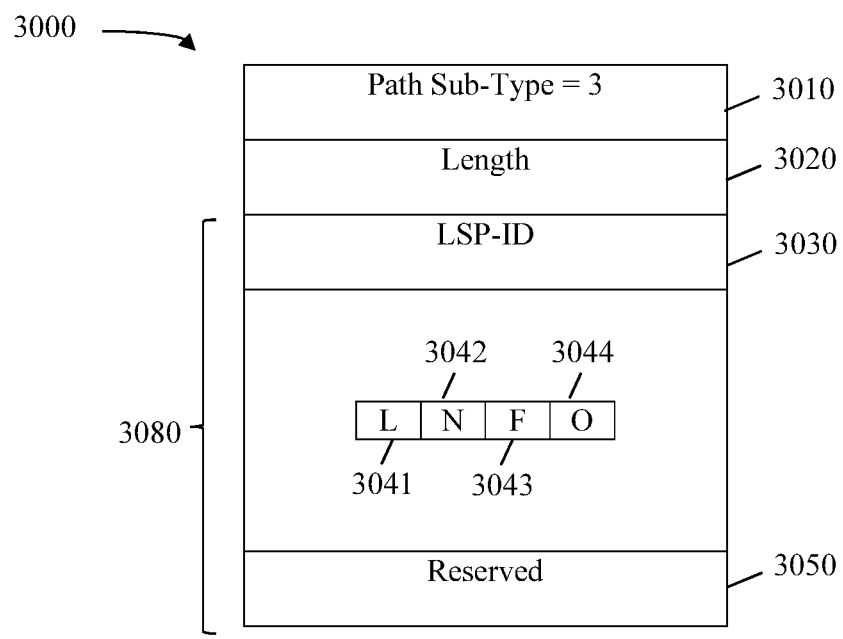
FIG. 30 is a schematic diagram of an embodiment of an LSP-ID path sub-TLV.

FIG. 30 is a schematic diagram of an embodiment of an LSP-ID path sub-TLV 3000. The LSP-ID path sub-TLV 3000 is employed by a ZR controller such as the ZR controllers 310, 410, and 510, edge nodes such as the edge nodes 321, 421, and 521, and/or internal nodes such as the internal nodes 322, 422, and 522 of a network such as the networks 330, 430, and 530 to create and delete LSPs such as the LSPs 251, 351, 451, and 551 in the network. The LSP-ID path sub-TLV 3000 may be included in the path sub-TLVs 2230 of the path TLV 2200. The LSP-ID path sub-TLV 3000 comprises a path sub-type field 3010, a length field 3020, and a value field 3080. The value field 3080 comprises an LSP-ID field 3030, an L flag 3041, an N flag 3042, an F flag 3043, an O flag 3044, and a reserved field 3050. The path sub-type field 3010 is about two octets long and may be set to a value of three to indicate that the LSP-ID path sub-TLV 3000 is an LSP-ID path sub-TLV. The length field 3020 is about two octets long and indicates the length of the value field 3080. The LSP-ID field 3030 is about four octets long and indicates a global ID of an LSP. The L flag 3041, the N flag 3042, the F flag 3043, and the O flag 3044 are similar to the L flag 1944, the N flag 1945, the F flag 1946, and the O flag 1947, respectively. The reserved field 3050 is about 28 bits long and is reserved for future use.

Figure 31:
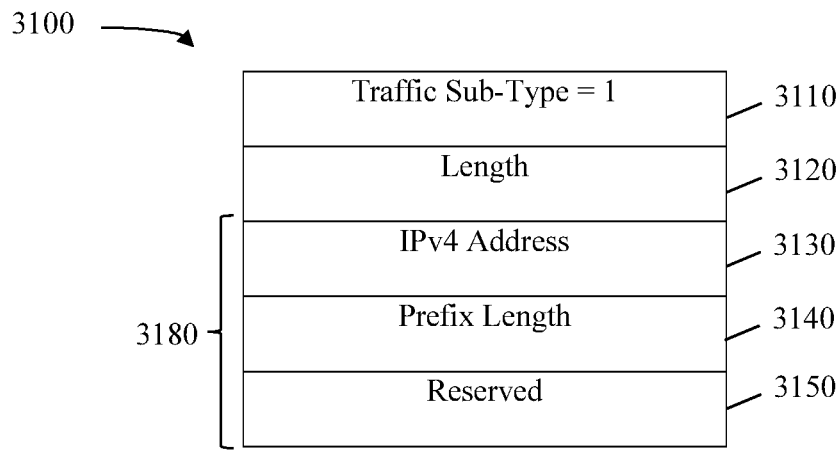
FIG. 31 is a schematic diagram of an embodiment of an IPv4 forwarding equivalence class (FEC) sub-TLV.

FIG. 31 is a schematic diagram of an embodiment of an IPv4 FEC sub-TLV 3100. The IPv4 FEC sub-TLV 3100 is employed by a ZR controller such as the ZR controllers 310, 410, and 510, edge nodes such as the edge nodes 321, 421, and 521, and/or internal nodes such as the internal nodes 322, 422, and 522 of a network such as the networks 330, 430, and 530 to create and delete LSPs such as the LSPs 251, 351, 451, and 551 in the network. The IPv4 FEC sub-TLV 3100 may be included in the traffic sub-TLVs 2530 of the traffic TLV 2500. The IPv4 FEC sub-TLV 3100 comprises a traffic sub-type field 3110, a length field 3120, and a value field 3180. The value field 3180 comprises an IPv4 address field 3130, a prefix length field 3140, and a reserved field 3150. The traffic sub-type field 3110 is about two octets long and may be set to a value of one to indicate that the IPv4 FEC sub-TLV 3100 is an IPv4 FEC sub-TLV. The length field 3120 is about two octets long and indicates the length of the value field 3180. The IPv4 address field 3130 is about four octets long and indicates an IPv4 address of a network node. For example, the network node may correspond to a destination node or a destination endpoint of a data flow, where the IPv4 address with a prefix length may be employed as a match condition for data flow. The prefix length field 3140 is about one octet long and indicates a prefix length (e.g., for a subnet). The reserved field 3150 is about three octets long and is reserved for future use.

Figure 32:
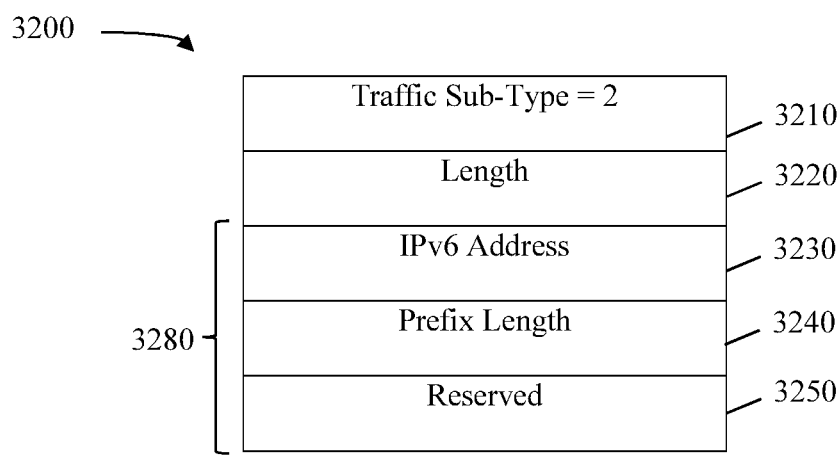
FIG. 32 is a schematic diagram of an embodiment of an IPv6 FEC sub-TLV.

FIG. 32 is a schematic diagram of an embodiment of an IPv6 FEC sub-TLV 3200. The IPv6 FEC sub-TLV 3200 is employed by a ZR controller such as the ZR controllers 310, 410, and 510, edge nodes such as the edge nodes 321, 421, and 521, and/or internal nodes such as the internal nodes 322, 422, and 522 of a network such as the networks 330, 430, and 530 to create and delete LSPs such as the LSPs 251, 351, 451, and 551 in the network. The IPv6 FEC sub-TLV 3200 may be included in the traffic sub-TLVs 2530 of the traffic TLV 2500. The IPv6 FEC sub-TLV 3200 comprises a traffic sub-type field 3210, a length field 3220, and a value field 3280. The value field 3280 comprises an IPv6 address field 3230, a prefix length field 3240, and a reserved field 3250. The traffic sub-type field 3210 is about two octets long and may be set to a value of two to indicate that the IPv6 FEC sub-TLV 3200 is an IPv6 FEC sub-TLV. The length field 3220 is about two octets long and indicates the length of the value field 3280. The IPv6 address field 3230 is about sixteen octets long and indicates an IPv6 address of a network node. For example, the network node may correspond to a destination node of a data flow, where the IPv6 address with a prefix length may be employed as a match condition for data flow. The prefix length field 3240 is about one octet long and indicates a prefix length (e.g., for a subnet). The reserved field 3250 is about three octets long and is reserved for future use.

Figure 33:
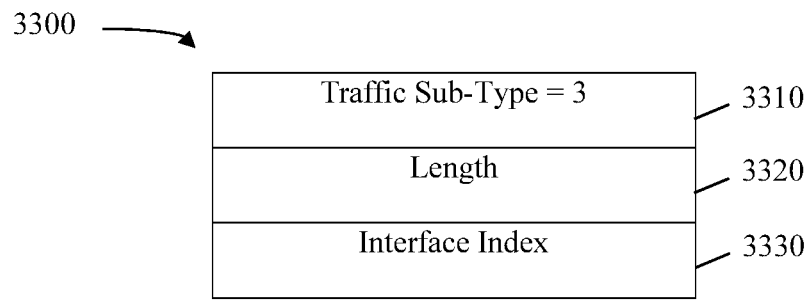
FIG. 33 is a schematic diagram of an embodiment of an interface index sub-TLV.

FIG. 33 is a schematic diagram of an embodiment of an interface index sub-TLV 3300. The interface index sub-TLV 3300 is employed by a ZR controller such as the ZR controllers 310, 410, and 510, edge nodes such as the edge nodes 321, 421, and 521, and/or internal nodes such as the internal nodes 322, 422, and 522 of a network such as the networks 330, 430, and 530 to create and delete LSPs such as the LSPs 251, 351, 451, and 551 in the network. The interface index sub-TLV 3300 may be included in the traffic sub-TLVs 2530 of the traffic TLV 2500. The interface index sub-TLV 3300 comprises a traffic sub-type field 3310, a length field 3320, and an interface index field 3330. The traffic sub-type field 3310 is about two octets long and may be set to a value of three to indicate that the interface index sub-TLV 3300 is an interface index sub-TLV. The length field 3320 is about two octets long and indicates the length of the interface index field 3330. The interface index field 3330 is about four octets long and indicates an interface index, which may be employed for identifying a particular data flow.

Figure 34:
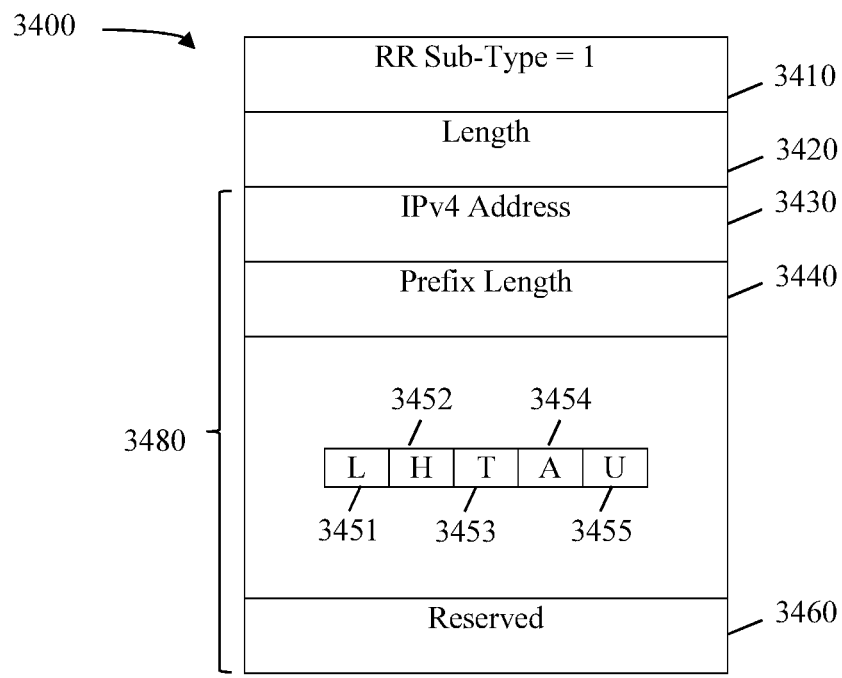
FIG. 34 is a schematic diagram of an embodiment of an IPv4 address RR sub-TLV.

FIG. 34 is a schematic diagram of an embodiment of an IPv4 address RR sub-TLV 3400. The IPv4 address RR sub-TLV 3400 is employed by a ZR controller such as the ZR controllers 310, 410, and 510, edge nodes such as the edge nodes 321, 421, and 521, and/or internal nodes such as the internal nodes 322, 422, and 522 of a network such as the networks 330, 430, and 530 to create and delete LSPs such as the LSPs 251, 351, 451, and 551 in the network. The IPv4 address RR sub-TLV 3400 may be included in the RR sub-TLVs 2330 of the RR TLV 2300. The IPv4 address RR sub-TLV 3400 comprises a RR sub-type field 3410, a length field 3420, and a value field 3480. The value field 3480 comprises an IPv4 address field 3430, a prefix length field 3440, a L flag 3451, an H flag 3452, a T flag 3453, an A flag 3454, a U flag 3455, and a reserved field 3460.

The RR sub-type field 3410 is about two octets long and may be set to a value of one to indicate that the IPv4 address RR sub-TLV 3400 is an IPv4 address RR sub-TLV. The length field 3420 is about two octets long and indicates the length of the value field 3480. The IPv4 address field 3430, the prefix length field 3440, the L flag 3451, the H flag 3452, and the T flag 3453 are similar to the IPv4 address field 2830, the prefix length fields 2840 and 2940, the L flags 2851 and 2951, the H flags 2852 and 2952, the T flags 2853 and 2953, respectively. The A flag 3454 is about one bit long and set to a value of one to indicate that protection is available at the downstream link of the node identified by the IPv4 address. The U flag 3455 is about one bit long and set to a value of one to indicate that protection is in use at the downstream link of the node identified by the IPv4 address. The reserved field 3460 is about 19 bits long and is reserved for future use.

Figure 35:
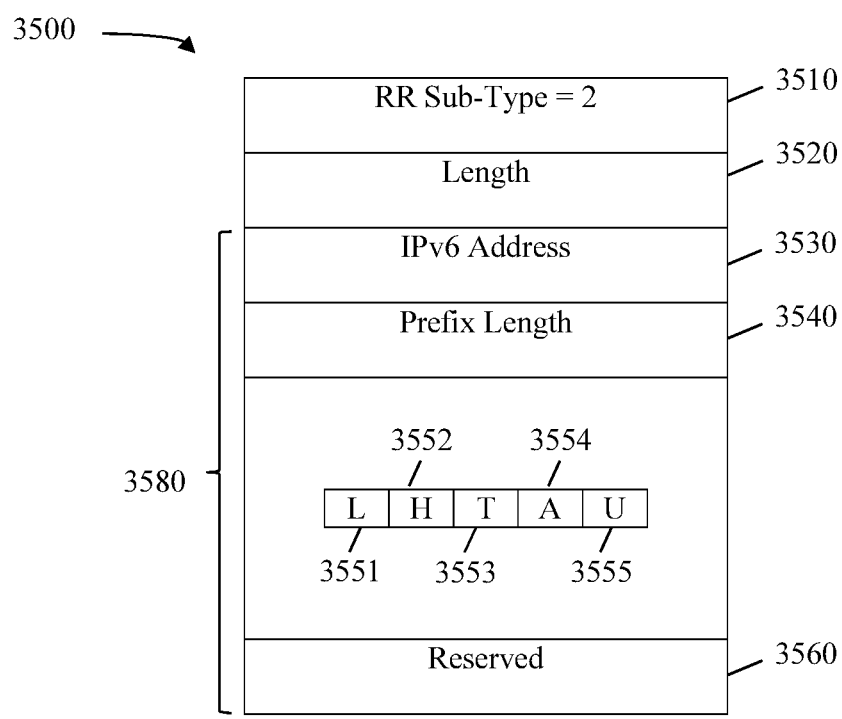
FIG. 35 is a schematic diagram of an embodiment of an IPv6 address RR sub-TLV.

FIG. 35 is a schematic diagram of an embodiment of an IPv6 address RR sub-TLV 3500. The IPv6 address RR sub-TLV 3500 is employed by a ZR controller such as the ZR controllers 310, 410, and 510, edge nodes such as the edge nodes 321, 421, and 521, and/or internal nodes such as the internal nodes 322, 422, and 522 of a network such as the networks 330, 430, and 530 to create and delete LSPs such as the LSPs 251, 351, 451, and 551 in the network. The IPv6 address RR sub-TLV 3500 may be included in the RR sub-TLVs 2330 of the RR TLV 2300. The IPv6 address RR sub-TLV 3500 comprises a RR sub-type field 3510, a length field 3520, and a value field 3580. The value field 3580 comprises an IPv6 address field 3530, a prefix length field 3540, an L flag 3551, an H flag 3552, a T flag 3553, an A flag 3554, a U flag 3555, and a reserved field 3560.

The RR sub-type field 3510 is about two octets long and may be set to a value of two to indicate that the IPv6 address RR sub-TLV 3500 is an IPv6 address RR sub-TLV. The length field 3520 is about two octets long and indicates the length of the value field 3580. The IPv6 address field 3530 is similar to the IPv6 address field 2930. The prefix length field 3540 is similar to the prefix length fields 2840, 2940, and 3440. The L flag 3551 is similar to the L flags 2851, 2951, and 3451. The H flag 3552 is similar to the H flags 2852, 2952, and 3452. The T flag 3553 is similar to the T flags 2853, 2953, and 3453. The A flag 3554 is similar to the A flag 3454. The U flag 3555 is similar to the U flag 3455. The reserved field 3560 is about 19 bits long and is reserved for future use.

In an embodiment, a ZR controller such as the ZR controllers 310, 410, and 510 sends a first LSA such as the LSA 1800 to a communication node such as the edge nodes PE2 321 and 521 and the internal nodes P3 422 and 522 to request creation or deletion of an LSP such as the LSPs 251, 351, 451, and 551. The LSA includes an LSP-ID TLV such as the LSP-ID TLV 1900, an IPv4 destination TLV such as the IPv4 destination address TLV 2000, a path TLV such as the path TLV 2200, a traffic TLV such as the traffic TLV 2500, and an IPv4 controller TLV such as the IPv4 controller TLV 2600. The path TLV includes a plurality of path sub-TLVs such as the path sub-TLV 2800 for the IPv4 addresses of the nodes the LSP traverses. To create an LSP, the LSA indicates an LSP creation request in an LSA action field such as the LSP action field 1820. To delete an LSP, the LSA indicates an LSP deletion request in an LSA action field such as the LSP action field 1820.

After receiving the first LSA, the communication node sends a first acknowledgement to the controller. In addition, it sends a second LSA such as the LSA 1800 to a next-hop node along the route or the shortest path to a corresponding egress node of the LSP if the communication node is not the egress node. The second LSA comprises the same contents (i.e., TLVs) as the first LSA. This is called relaying an LSA. Each of the transit nodes along the route or the shortest path from the controller to the egress node of the LSP relays the LSA in the same way as the communication node. After the egress node of the LSP receives the LSA from a NE, it sends an acknowledgment to the NE. The egress node initiates the creation and/or deletion of the LSP according to the contents of the LSA received. In one embodiment, each of the nodes along the route or the shortest path from the controller to the egress node of the LSP flushes its LSA after it sends the LSA to a next-hop node and receives an acknowledgement for the LSA from the next-hop node. In another embodiment, the controller flushes its LSA for the creation and/or deletion of the LSP after receiving a response message or LSA for the status of the creation and/or deletion of the LSP. Each of the other nodes along the route or the shortest path from the controller to the egress node of the LSP flushes its LSA generated for relaying the LSA generated by the controller after receiving a flushed LSA for the LSA generated by the controller from a previous hop node along the route or the shortest path.

The egress node and other transit nodes such as the internal nodes 322 along the LSP sends an LSA to a next upstream node along the LSP to request creation and/or deletion of the LSP. The LSA sent by the egress node or the transit nodes are substantially similar to an LSA sent by the ZR controller, but comprises a label TLV such as the label TLV 2100, and the path TLV includes addresses of a portion of the LSP (e.g., ends at the receiving node). The ingress node of the LSP sends an LSA to the ZR controller to indicate an LSP creation and/or a deletion status. The LSA sent by the ingress node comprises an LSP-ID TLV such as the LSP-ID TLV 1900 with an S flag such as the S flag 1942 set to one indicating that the LSP is set up or a D flag such as the D flag 1943 set to one indicating that the LSP is deleted.

The ingress node of the LSP sends a first LSA for indicating an LSP creation and/or a deletion status to a next-hop node along a route or shortest path from the ingress node to the controller. After receiving the first LSA, the next-hop node sends a first acknowledgement to its previous hop node (e.g., the ingress node) from which the LSA is received. In addition, it sends a second LSA to its next-hop node along the route or the shortest path to the controller if it is not the controller. The second LSA comprises the same contents (i.e., TLVs) as the first LSA. Each of the transit nodes along the route or the shortest path from the ingress node to the controller relays the LSA in the same way as the next-hop node. After the controller receives the LSA from a NE, it sends an acknowledgment to the NE. The controller updates the P2P LSPDB or P2MP LSPDB for the LSP according to the contents of the LSA received. In one embodiment, each of the nodes along the route or the shortest path from the ingress node of the LSP to the controller flushes its LSA for the creation and/or deletion status of the LSP or relaying an LSA for the status of the LSP after it sends the LSA to a next-hop node and receives an acknowledgement for the LSA from the next-hop node.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed:

1. An apparatus for zone routing, comprising:
   a transmitter coupled to one or more communication nodes in a network, wherein the communication nodes correspond to less than all edge nodes of the network;
   a receiver coupled to the communication nodes;
   a memory configured to store a routing information base (RIB) identifying one of the communication nodes available as a next-hop node for each of a plurality of paths to nodes in the network, wherein the plurality of paths comprises a second path; and
   a processor coupled to the transmitter, the memory, and the receiver, wherein the processor is configured to:
      compute a first path through the network for a label switched path (LSP), wherein the first path extends from an ingress node of the edge nodes to an egress node of the edge nodes;
      obtain the second path that traverses through a first communication node of the communication nodes available to the egress node;
      determine that the second path is a shortest path among the plurality of paths to the egress node according to the RIB;
      select the first communication node according to the shortest path determined from the RIB; and
      send, via the transmitter, a first LSP creation request message to the first communication node requesting creation of the LSP along the first path.

2. The apparatus of claim 1, wherein the first communication node is one of the edge nodes of the network.

3. The apparatus of claim 1, wherein the first communication node is an internal node of the network.

4. The apparatus of claim 1, wherein the processor is further configured to receive an LSP creation response message from a second communication node of the communication nodes, wherein the communication nodes available have third paths from the ingress node of the LSP, wherein the second communication node has a shortest third path from the ingress node, and wherein the LSP creation response message indicates a creation status of the LSP along the first path.

5. The apparatus of claim 4, wherein the processor is further configured to:
   obtain a global identifier (ID) for identifying the LSP, wherein the LSP creation request message comprises the global ID;
   send, via the transmitter, an LSP deletion request message to the first communication node requesting deletion of the LSP from the network, wherein the LSP deletion request message comprises the global ID; and
   receive, via the receiver, an LSP deletion response message from the second communication node indicating a deletion status of the LSP along the first path.

6. The apparatus of claim 4, wherein the second communication node and the first communication node correspond to a same node in the network.

7. A method implemented by a network controller in a zone routing network comprising a plurality of edge nodes and one or more communication nodes, the method comprising:
   storing a routing information base (RIB) identifying one of the communication nodes available as a next-hop node for each of a plurality of paths to nodes in the zone routing network, wherein the plurality of paths comprises a second path;
   computing, via a processor of the network controller, a first path through the network for a label switched path (LSP), wherein the first path extends from an ingress node of the edge nodes to an egress node of the edge nodes;
   obtaining, via the processor, the second path that traverses through a first communication node of the communication nodes available to the egress node;
   determining that the second path is a shortest path among the plurality of paths to the egress node according to the RIB;
   selecting the first communication node according to the shortest path determined from the RIB; and
   sending, via a transmitter of the network controller, a first LSP creation request message to the first communication node requesting creation of the LSP along the first path,
   wherein the communication nodes are not all the edge nodes.

8. The method of claim 7, further comprising receiving, via a receiver of the network controller, an LSP creation response message from a second communication node of the communication nodes, wherein the communication nodes available have third paths from the ingress node of the LSP, wherein the second communication node has a shortest third path from the ingress node, and wherein the LSP creation response message indicates a creation status of the LSP along the first path.

9. The method of claim 8, wherein the first communication node is one of the edge nodes of the network.

10. The method of claim 8, wherein the first communication node is an internal node of the network.

* * * * *